US012771868B2

(12) United States Patent
Zhang et al.

(10) Patent No.: US 12,771,868 B2
(45) Date of Patent: *Oct. 20, 2026

(54) GENERALIZED BI-PREDICTION FOR VIDEO CODING WITH REDUCED CODING COMPLEXITY

(71) Applicant: INTERDIGITAL VC HOLDINGS, INC., Wilmington, DE (US)

(72) Inventors: Yan Zhang, San Diego, CA (US); Xiaoyu Xiu, San Diego, CA (US); Yuwen He, San Diego, CA (US); Yan Ye, San Diego, CA (US)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/921,599

(22) Filed: Oct. 21, 2024

(65) Prior Publication Data

US 2025/0056038 A1 Feb. 13, 2025

Related U.S. Application Data

(63) Continuation of application No. 17/504,150, filed on Oct. 18, 2021, now Pat. No. 12,149,734, which is a
(Continued)

(51) Int. Cl.
*H04N 19/577* (2014.01)
*H04N 19/176* (2014.01)
(Continued)

(52) U.S. Cl.
CPC ......... *H04N 19/577* (2014.11); *H04N 19/176* (2014.11); *H04N 19/31* (2014.11); *H04N 19/573* (2014.11)

(58) Field of Classification Search
CPC .... H04N 19/577; H04N 19/176; H04N 19/31; H04N 19/573
See application file for complete search history.

(56) References Cited

U.S. PATENT DOCUMENTS 5,832,124 A 11/1998 Sato
7,801,217 B2 9/2010 Boyce
(Continued)

FOREIGN PATENT DOCUMENTS

CN 101176350 A 5/2008
CN 101695114 A 4/2010
(Continued)

OTHER PUBLICATIONS

Huang, et al, "A New Multi-hypothesis Motion-compensated Prediction Algorithm", Journal of Image and Graphics, vol. 13 No. 3, Mar. 2008 (7 pages.).
(Continued)

*Primary Examiner* — Nam D Pham
(74) *Attorney, Agent, or Firm* — Klintworth & Rozenblat LLP

(57) ABSTRACT

Exemplary embodiments include systems and methods for coding a video comprising a plurality of pictures including a current picture, a first reference picture, and a second reference picture, where each picture includes a plurality of blocks. In one method, for at least a current block in the current picture, a number of available bi-prediction weights is determined based at least in part on a temporal layer and/or a quantization parameter of the current picture. From among available bi-prediction weights a pair of weights are identified. Using the identified weights, the current block is then predicted as a weighted sum of a first reference block in the first reference picture and a second reference block in the second reference picture. Encoding techniques are also
(Continued)

described for efficient searching and selection of a pair of bi-prediction weights to use for prediction of a block.

12 Claims, 14 Drawing Sheets

Related U.S. Application Data continuation of application No. 16/964,144, filed as application No. PCT/US2019/014691 on Jan. 23, 2019, now Pat. No. 11,153,602.

(60) Provisional application No. 62/621,524, filed on Jan. 24, 2018.

(51) Int. Cl.
*H04N 19/31* (2014.01)
*H04N 19/573* (2014.01)

(56) References Cited

U.S. PATENT DOCUMENTS

| | | | | |
|---|---|---|---|---|
| 10,298,939 | B2 | 5/2019 | Coban | |
| 10,805,631 | B2 * | 10/2020 | Lee | H04N 19/70 |
| 2003/0215014 | A1 | 11/2003 | Koto | |
| 2004/0008782 | A1 | 1/2004 | Boyce | |
| 2004/0008786 | A1 | 1/2004 | Boyce | |
| 2004/0141615 | A1 | 7/2004 | Chujoh | |
| 2004/0184544 | A1 | 9/2004 | Kondo | |
| 2006/0133488 | A1 | 6/2006 | Park | |
| 2006/0268166 | A1 | 11/2006 | Bossen | |
| 2007/0110390 | A1 | 5/2007 | Toma | |
| 2009/0034854 | A1 | 2/2009 | Lee | |
| 2010/0215095 | A1 | 8/2010 | Hayase | |
| 2011/0007803 | A1 | 1/2011 | Karczewicz | |
| 2012/0163455 | A1 | 6/2012 | Zheng | |
| 2012/0230417 | A1 | 9/2012 | Sole Rojals | |
| 2013/0243093 | A1 | 9/2013 | Chen | |
| 2013/0259122 | A1 * | 10/2013 | Sugio | H04N 19/58 375/240.25 |
| 2013/0336401 | A1 | 12/2013 | Jeon | |
| 2014/0105299 | A1 | 4/2014 | Chen | |
| 2014/0153647 | A1 | 6/2014 | Nakamura | |
| 2014/0161175 | A1 | 6/2014 | Zhang | |
| 2014/0198846 | A1 | 7/2014 | Guo | |
| 2014/0253681 | A1 | 9/2014 | Zhang | |
| 2014/0321551 | A1 | 10/2014 | Ye | |
| 2014/0362922 | A1 | 12/2014 | Puri | |
| 2015/0195563 | A1 | 7/2015 | Ramasubramonian | |
| 2015/0319441 | A1 | 11/2015 | Puri | |
| 2016/0029035 | A1 | 1/2016 | Nguyen | |
| 2017/0034513 | A1 | 2/2017 | Leontaris | |
| 2017/0264904 | A1 | 9/2017 | Koval | |
| 2017/0280163 | A1 | 9/2017 | Kao | |
| 2018/0098086 | A1 | 4/2018 | Chuang | |
| 2018/0249171 | A1 | 8/2018 | Lim | |
| 2019/0230350 | A1 | 7/2019 | Chen | |

FOREIGN PATENT DOCUMENTS

| | | | |
|---|---|---|---|
| CN | 101766030 | A | 6/2010 |
| CN | 101855910 | A | 10/2010 |
| CN | 101902645 | A | 12/2010 |
| CN | 102804775 | A | 11/2012 |
| CN | 103636202 | A | 3/2014 |
| CN | 104769948 | A | 7/2015 |
| CN | 104798372 | A | 7/2015 |
| CN | 104969551 | A | 10/2015 |
| CN | 105009586 | A | 10/2015 |
| CN | 105453570 | A | 3/2016 |
| CN | 105830446 | A | 8/2016 |
| EP | 2394437 | A1 | 12/2011 |
| EP | 2394437 | B1 | 12/2011 |
| EP | 2735151 | A1 | 5/2014 |
| EP | 2763414 | | 8/2014 |
| EP | 2951996 | A1 | 12/2015 |
| JP | 2004007377 | | 1/2004 |
| JP | 2005533466 | | 11/2005 |
| JP | 2008541502 | | 11/2008 |
| JP | 2010028864 | | 2/2010 |
| JP | 2011151683 | A | 8/2011 |
| KR | 20050021487 | A | 3/2005 |
| WO | 2004008761 | | 1/2004 |
| WO | 2004008761 | A1 | 1/2004 |
| WO | 2006128072 | A2 | 11/2006 |
| WO | 2010090749 | | 8/2010 |
| WO | 2014039802 | A2 | 3/2014 |
| WO | 2014081775 | A1 | 5/2014 |
| WO | 2015010317 | A1 | 1/2015 |
| WO | 2017197146 | | 11/2017 |
| WO | 2017197146 | A1 | 11/2017 |
| WO | 2018037919 | A1 | 3/2018 |

OTHER PUBLICATIONS

Alshina, E., et al., "Known Tools Performance Investigation for Next Generation Video Coding". ITU—Telecommunications Standardization Sector, Video Coding Experts Group (VCEG), SG16/Q6, Power Point Presentation, VCEG-AZ05, Jun. 2015, 7 pages.

Alshina, E., et al., "Known Tools Performance Investigation for Next Generation Video Coding". ITU—Telecommunications Standardization Sector, Video Coding Experts Group (VCEG), SG16/Q6, VCEG-AZ05, Jun. 2015, 7 pages.

Alshina, E., et al., "Known Tools Performance Investigation for Next Generation Video Coding". Samsung Electronics, Video Coding Experts Group (VCEG), Telecommunications Standardization Sector ITU-T SG16/Q6, Doc. VCEG-AZ05, Jun. 2015, 7 pages.

Alshina, E., et al., "Known Tools Performance Investigation for Next Generation Video Coding". Samsung Electronics, Video Coding Experts Group (VCEG), Telecommunications Standardization Sector ITU-T SG16/Q6, Doc. VCEG-AZ05, Power Point Presentation, Jun. 2015, 9 pages.

An, J., et al., "Block Partitioning Structure for Next Generation Video Coding". ITU—Telecommunication Standardization Sector, Study Group 16, Contribution 966 R3, COM16-C966R3-E, Sep. 2015, pp. 1-8.

An, J., et al., "Block Partitioning Structure for Next Generation Video Coding". MediaTek Inc., Telecommunication Standardization Sector ITU-T SG16/Q6, Doc. COM16-C966, Sep. 2015, 8 pages.

Bross, et al., "High Efficiency Video Coding (HEVC) Text Specification Draft 10 (for FDIS and Last Call)". Joint Collaborative Team on Video Coding (JCT-VC), Document No. JCTVC-L1003, Jan. 2013, 310 pages.

Chen , Jianle, et al., "Coding Tools Investigation for Next Generation Video Coding". ITU—Telecommunication Standardization Sector, Study Group 16, Contribution 806, COM16-C806, Jan. 2015, pp. 1-7.

Chen, C.-C., et al., "Generalized Bi-Prediction for Inter Coding". InterDigital Communications, Inc., Joint Video Exploration Team (JVET), ITU-T SG 16 WP 3 and ISO/IEC JTC 1/SC 29/WG 11, Doc. JVET-C0047, May 2016, 4 pages.

Chen, C.-C., et al., "Generalized Bi-Prediction for Inter Coding". InterDigital Communications, Inc., Joint Video Exploration Team (JVET), ITU-T SG 16 WP 3 and ISO/IEC JTC 1/SC 29/WG 11, Doc. JVET-C0047, Power Point Presentation, May 2016, 8 pages.

Chen, Jianle, et al. "Description of scalable video coding technology proposal by Qualcomm (configuration 1)." Joint Collaborative Team on Video Coding (JCT-VC) of ITU-T SG16 WP3 and ISO/IEC JTC1/SC29/WG11, Doc. JCTVC-K0035, 11th Meeting: Shanghai, CN, Oct. 10-19, 2012 (19 pages).

Chen, Jianle, et al., "Coding Tools Investigation for Next Generation Video Coding Based on HEVC". Applications of Digital Image Processing XXXVIII, vol. 9599, International Society for Optics and Photonics, (2015), pp. 95991B-1 to 95991B-9.

Discrete Consine Transform, http://ww.mathworks.com/help/images/discrete-consine-transform.html, Nov. 2012, 3 pages.

(56) References Cited

OTHER PUBLICATIONS

Hannuksela, M., "Generalized B/MH-Picture Averaging." In Joint Video Team (JVT) of ISO/IEC MPEG & ITU-T VCEG (ISO/IEC JTC1/SC29/WG11 and ITU-T SG16 Q. 6), 3rd Meeting: Fairfax, VA, USA, 2002 (8 pages).
He, Y., et al., "CE4-related: Encoder Speed Up and Bug Fix for Generalized Bi-Prediction in BMS-2.1". The Joint Video Exploration Team (JVET) Meeting, Oct. 3-12, 2018, pp. 1-5.
International Preliminary Report on Patentability for PCT/US2017/031303 issued on Nov. 6, 2018.
International Preliminary Report on Patentability for PCT/US2017/032208 issued on Nov. 13, 2018.
International Preliminary Report on Patentability for PCT/US2019/014691 issued on Jul. 28, 2020, 9 pages.
International Search Report and Written Opinion of the International Searching Authority for PCT/US2019/014691 mailed May 15, 2019, 13 pages.
International Search Report and Written Opinion of the International Searching Authority, for PCT/US2017/032208 mailed Oct. 12, 2017, 19 pages.
International Search Report and Written Opinion of the International Searching Authority, for PCT/US2017/31303 mailed Sep. 8, 2017, 21 pages.
International Telecommunication Union, "Advanced Video Coding for Generic Audiovisual Services". In Series H: Audiovisual and Multimedia Systems; Infrastructure of audiovisual services; Coding of moving video. ITU-T Rec H.264 (Nov. 2007), 564 pages, Nov. 2007.
International Telecommunication Union, "Advanced Video Coding for Generic Audiovisual Services". Series H: Audiovisual and Multimedia System; Infrastructure of audiovisual services, Coding of moving video, ITU-T Recommendation H.264, ISO/IEC/MPEG 4 Part 10, Nov. 2007, 564 pages.
International Telecommunication Union, "Advanced Video Coding for Generic Audiovisual Services". Series H: Audiovisual and Multimedia System; Infrastructure of audiovisual services, Coding of moving video, ITU-T Recommendation H.264, Mar. 2010, 676 pages.
International Telecommunication Union, "Affine Transform Prediction for Next Generation Video Coding". Huawei Technologies Co., Ltd., Telecommunication Standardization Sector, ITU-T SG16/Q6 Doc. COM16-C1016, Sep. 2015, pp. 1-11.
International Telecommunication Union, "High Efficiency Video Coding". Series H: Audiovisual and Multimedia Systems; Infrastructure of Audiovisual Services—Coding of Moving Video, Recommendation ITU-T H.265, Telecommunication Standardization Sector of ITU, Apr. 2015, 9 pages.
Invitation to pay additional fees and, where applicable, protest fee for PCT/US2017/031303 mailed Jul. 11, 2017, 17 pages.
Invitation to Pay Additional Fees, And Where Applicable, Protest Fee For PCT/US2017/032208 mailed on Aug. 14, 2017, 13 Pages.
Kamikura, Kazuto, et al., "Global Brightness-Variation Compensation for Video Coding". IEEE Transactions on Circuits and Systems for Video Technology, vol. 8, No. 8, Dec. 1998, pp. 988-1000.
Karczewicz, M., et al., "Report of AHG1 On Coding Efficiency Improvements". ITU—Telecommunications Standardization Sector, Video Coding Experts Group (VCEG), SG16/Q6, VCEG-AZ01, Jun. 2015, 2 pages.
Kikuchi, Y. et al., "Multi-frame interpolative prediction with modified syntax." Joint Video Team (JVT) of ISO/IEC MPEG & ITU-T VCEG,(ISO/IEC JTC1/SC29/WG11 and ITU-T SG16 Q. 6) Document: JVT-C066, 3rd Meeting: Fairfax, Virginia, Mar. 2002 (13 pages).
Liu, H., et al., "Local Illumination Compensation". Qualcomm Incorporated, Video Coding Experts Group (VCEG), Telecommunications Standardization Sector ITU-T SG16/Q6, Doc. VCEG-AZ06, Jun. 2015, 4 pages.
Liu, H., et al., "Local Illumination Compensation". Qualcomm Incorporated, Video Coding Experts Group (VCEG), Telecommunications Standardization Sector ITU-T SG16/Q6, Doc. VCEG-AZ06, Power Point Presentation, Jun. 2015, 7 pages.
Motra, Ajit Singh, et al., "Fast Intra Mode Decision for HEVC Video Encoder". IEEE International Conference on Software, Telecommunications and Computer Networks (SOFTCOM), Sep. 11, 2012, 5 pages.
Ohm, Jens-Rainer., et al., "Report of AHG on Future Video Coding Standardization Challenges". International Organization for Standardization, Coding of Moving Pictures and Audio, ISO/IEC JTC1/SC29/WG11 MPEG2014/M36782, Jun. 2015, 4 pages.
Sharabayko M. et al. "Iterative intra prediction search for H. 265/HEVC". 2013 International Siberian Conference on Control and Communications (SIBCON), IEEE, Sep. 12, 2013, (4 pages).
SMPTE Standard "VC-1 Compressed Video Bitstream Format and Decoding Process". The society of motion picture and television engineers, SMPTE 421M, 2006, (493 pages).
Suehring, K., et al., "JVET Common Test Conditions and Software Reference Configurations". Joint Video Exploration Team (JVET), ITU-T SG16 WP3 and ISO/IEC JTC1/SC29/WG11, Doc. JVET-B1010, Feb. 2016 (4 pages).
Sullivan, G. J., et al., "Overview of the High Efficiency Video Coding (HEVC) Standard". IEEE Transaction on Circuits and Systems for Video Technology, vol. 22, No. 12, Dec. 2012, pp. 1649-1668.
Sullivan, Gary J., et al., "Overview of The High Efficiency Video Coding (HEVC) Standard". IEEE Transactions on Circuits and Systems for Video Technology, vol. 22, No. 12, Dec. 2012, pp. 1649-1668.
Wiegand, Thomas, et al., "Overview of the H.264/AVC Video Coding Standard". IEEE Transactions on Circuits and Systems for Video Technology, vol. 13, No. 7, Jul. 2003, pp. 560-576.
Wikipedia "Exponential-Golomb Coding". Wikipedia article modified on Jan. 30, 2016, available at: https://en.wikipedia.org/w/index.php?title=Exponential-Golomb_coding&oldid=702406490, 2 pages.
Xiu, Xiaoyu, et al., "Decoder-side Intra Mode Derivation for Block-Based Video Coding". Picture Coding Symposium (PCS), IEEE, Dec. 4, 2016, 5 pages.
Zhang, H., et al. "Fast intra prediction for high efficiency video coding." In: "Advances in Databases and Information Systems", Jan. 1, 2012, Springer International Publishing, vol. 7674, pp. 568-577 (10 pages).
Zhang, Zhenming, et al., "Improved Intra Prediction Mode-Decision Method". In Visual Communications and Image Processing, vol. 5960, Jul. 12, 2005, pp. 632-640.
Chen, C. et al., "Generalized bi-prediction method for future video coding." In 2016 Picture Coding Symposium (PCS), pp. 1-5. IEEE, 2016 (5 pages).
Chen, C, et al., "EE3: Generalized bi-prediction". Joint Video Exploration Team (JVET) ISO/IEC JTC1/SC29/WG11 and ITU-T SG 16, JVET-D0102, Oct. 2016 (6 pages).

* cited by examiner

GENERALIZED BI-PREDICTION FOR VIDEO CODING WITH REDUCED CODING COMPLEXITY

CROSS-REFERENCE TO RELATED APPLICATIONS

The present application is a continuation of U.S. patent application Ser. No. 17/504,150, filed Oct. 18, 2021, which is a continuation of U.S. patent application Ser. No. 16/964,144, filed Jul. 22, 2020, which is a national stage application under 35 U.S.C. 371 of International Application No. PCT/US2019/014691, entitled "GENERALIZED BI-PREDICTION FOR VIDEO CODING WITH REDUCED CODING COMPLEXITY", filed on Jan. 23, 2019, which claims benefit under 35 U.S.C. § 119(e) from U.S. Provisional Patent Application Ser. No. 62/621,524 entitled "GENERALIZED BI-PREDICTION FOR VIDEO CODING WITH REDUCED CODING COMPLEXITY," filed Jan. 24, 2018, all of which are hereby incorporated by reference in their entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG-1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

SUMMARY

Exemplary embodiments include methods that are used in video encoding and decoding (collectively "coding"). A method of coding a video comprising a plurality of pictures including a current picture, a first reference picture, and a second reference picture, where each picture includes a plurality of blocks. In one method, for at least a current block in the current picture, a number of available bi-prediction weights is determined based at least in part on a quality metric such as temporal layer and/or a quantization parameter of the current picture. From among the determined number of available bi-prediction weights, a pair of weights (a first weight and a second weight) are identified. The current block is then predicted as a weighted sum of a first reference block in the first reference picture and a second reference block in the second reference picture, with the first reference block being weighted by the first weight and the second reference block being weighted by the second weight. The same prediction may be performed on both the encoder and decoder side, and the encoder may signal a prediction residual in a bitstream.

In some embodiments, the number of available bi-prediction weights is signaled in the bitstream.

In some embodiments, information identifying a pair of bi-prediction weights is signaled in the bitstream, and, if one of the weights in the pair is larger than the other, the larger weight is used with the higher-quality reference picture. In such embodiments, it is not necessary to signal in the bitstream which one of the weights in the pair is associated with which reference picture, as that information can be inferred from the comparative quality of the reference pictures. In some embodiments, the higher-quality reference picture may be the reference picture that is temporally closer to the current picture. In some embodiments, the higher-quality reference picture may be the reference picture with a lower quantization parameter.

In some embodiments, the number of available bi-prediction weights depends at least in part on similarity between reference blocks, with the number of available bi-prediction weights being lower for greater levels of similarity between reference blocks.

In additional exemplary embodiments, techniques are described for selecting appropriate bi-prediction weights for encoding a block of video without necessarily searching through all available bi-prediction weights.

Further embodiments provide encoders and decoders comprising processors and non-transitory computer-readable media storing instructions operative to perform the encoding and decoding operations described herein. Additional embodiments include a non-transitory computer-readable storage medium storing a bitstream generated using the methods described herein.

DETAILED DESCRIPTION

Overview of Block-Based Video Coding.

Figure 1:
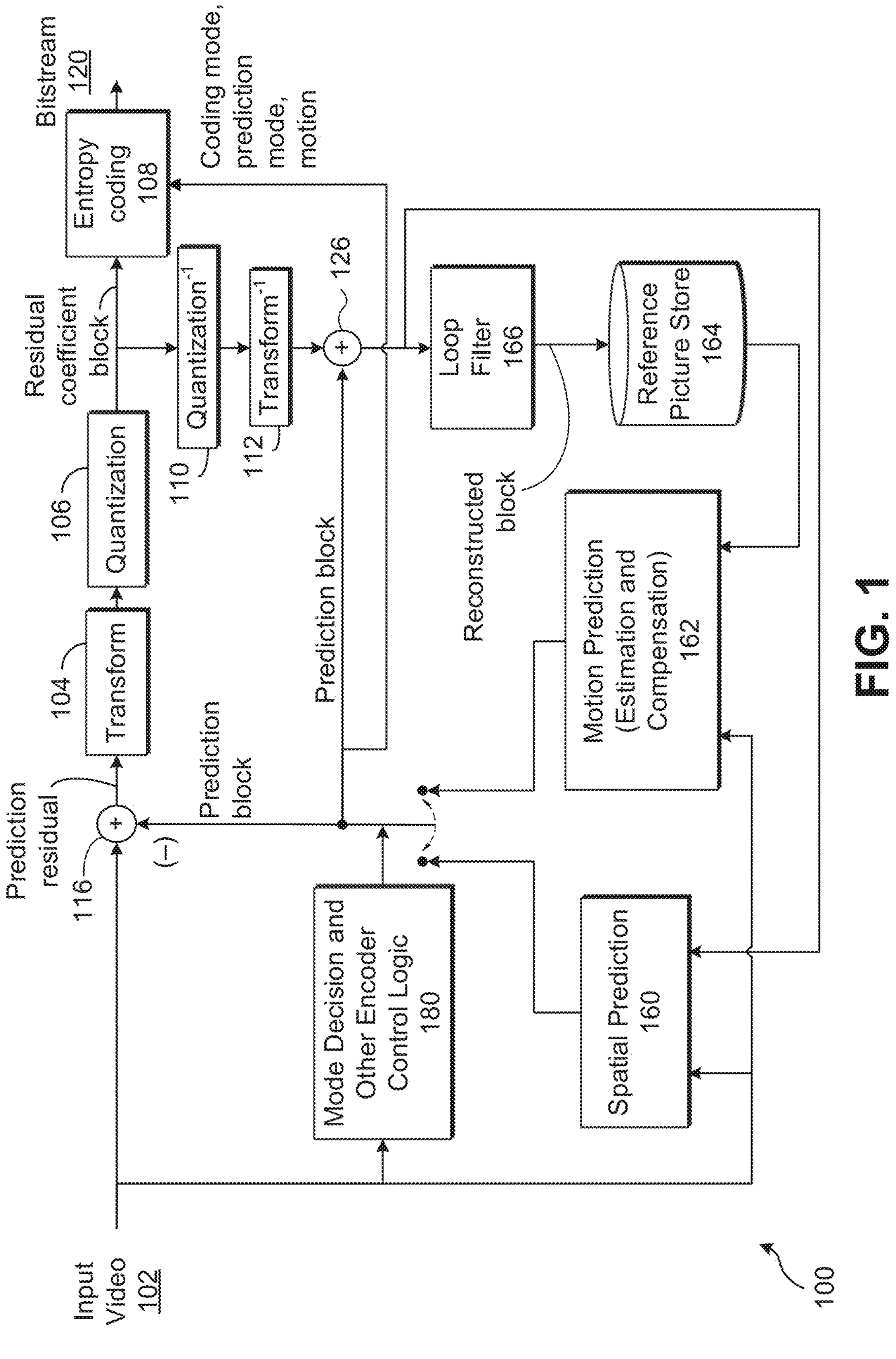
FIG. 1 is a functional block diagram of a block-based video encoder.

FIG. 1 is a functional block diagram of a block-based hybrid video encoding system. The input video signal 102 is processed block by block. In HEVC, extended block sizes (called a "coding unit" or CU) are used to efficiently compress high resolution (1080p and beyond) video signals.

In HEVC, a CU can be up to 64×64 pixels. A CU can be further partitioned into prediction units or PU, for which separate prediction methods are applied. For each input video block (MB or CU), spatial prediction (160) and/or temporal prediction (162) may be performed. Spatial prediction (or "intra prediction") uses pixels from the already coded neighboring blocks in the same video picture/slice to predict the current video block. Spatial prediction reduces spatial redundancy inherent in the video signal. Temporal prediction (also referred to as "inter prediction" or "motion compensated prediction") uses pixels from the already coded video pictures to predict the current video block. Temporal prediction reduces temporal redundancy inherent in the video signal. The temporal prediction signal for a given video block is usually signaled by one or more motion vectors which indicate the amount and the direction of motion between the current block and its reference block. Also, if multiple reference pictures are supported (as is the case for the recent video coding standards such as H.264/AVC or HEVC), then for each video block, its reference picture index is sent additionally and the reference index is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (116) to generate a prediction residual, and the prediction residual is de-correlated using transform (104) and quantization (106) to achieve the target bit-rate. The quantized residual coefficients are inverse quantized (110) and inverse transformed (112) to form the reconstructed residual, which is then added back to the prediction block (126) to form the reconstructed video block. Further in-loop filtering such as de-blocking filter and Adaptive Loop Filters may be applied (166) on the reconstructed video block before it is put in the reference picture store (164) and used to code future video blocks. To form the output video bit-stream 120, coding mode (inter or intra), prediction mode information, motion information, and quantized residual coefficients are all sent to the entropy coding unit (108) to be further compressed and packed to form the bit-stream.

Figure 2:
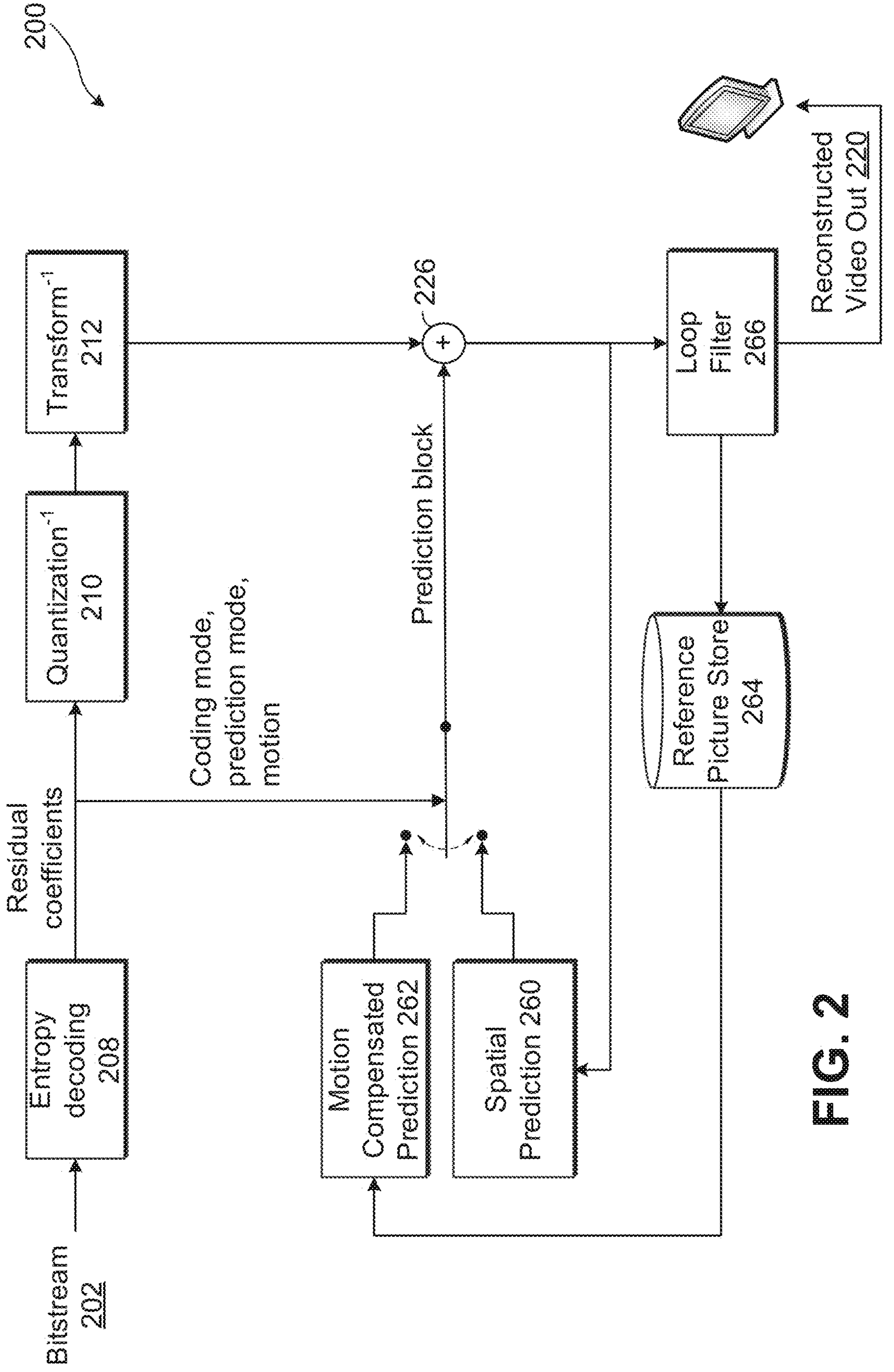
FIG. 2 is a functional block diagram of a video decoder.

FIG. 2 is a functional block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

In modern video codecs, bi-directional motion compensated prediction (MCP) is known for its high efficiency in removing temporal redundancy by exploiting temporal correlations between pictures, and it has been widely adopted in most of the state-of-the-art video codecs. However, the bi-prediction signal is formed simply by combining two uni-prediction signals using a weight value equal to 0.5. This is not necessarily the optimal way to combine the two uni-prediction signals, especially in conditions under which illuminance changes rapidly from one reference picture to another. Thus, several prediction techniques aiming at compensating the illuminance variation over time by applying some global or local weights and offset values to each of the sample values in reference pictures.

Weighted Bi-Prediction.

Weighted bi-prediction is a coding tool used primarily for compensating illuminance changes over time, such as fading transitions, when performing motion compensation. For each slice, two sets of multiplicative weight values and additive offset values are indicated explicitly and are applied separately to the motion compensated prediction, one at time for each reference list. This technique works best when illuminance changes linearly from picture to picture and the illumination change is global at the picture/slice level.

Local Illuminance Compensation.

Figure 3:
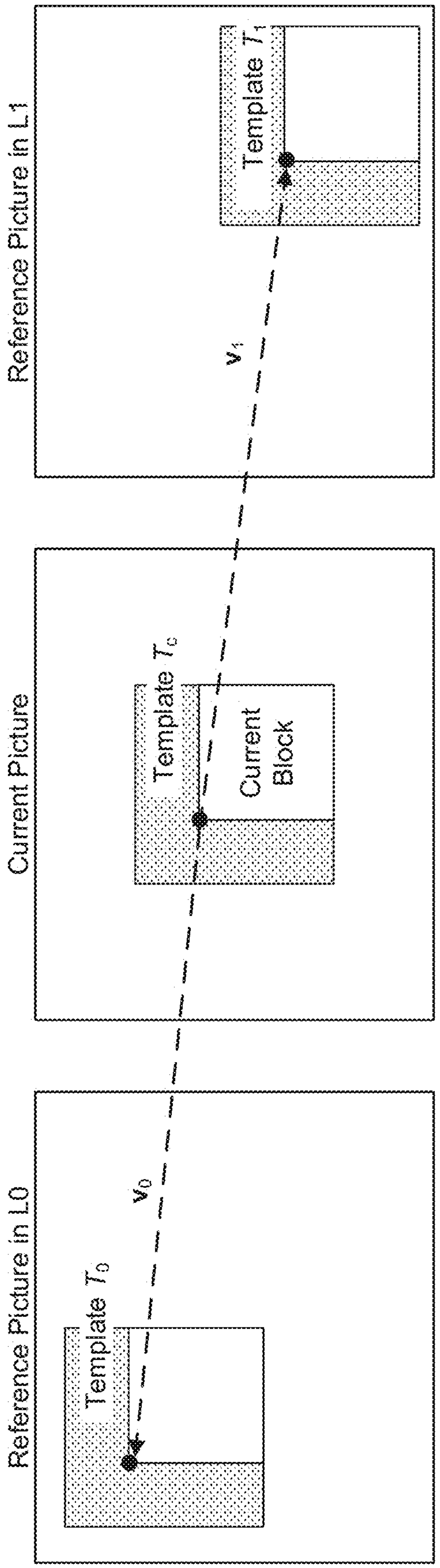
FIG. 3 is a schematic illustration of an example of the template, $T_c$, and its prediction blocks, $T_0$ and $T_1$, used in local illuminance compensation.

Local illuminance compensation approaches the problem by adapting parameters (two pairs of multiplicative weight values and additive offset values) on a block-by-block basis. Unlike the weighted bi-prediction, which indicates these parameters at slice level, this technique resorts to adapting the optimal parameters to the illuminance change between the reconstruction signals of the template ($T_C$) and the prediction signals ($T_0$ and $T_1$) of the template (see FIG. 3). The resulting parameters are optimized by minimizing the illuminance difference separately between $T_C$ and $T_0$ (for the first pair of weight and offset values) and between $T_C$ and $T_1$ (for the second pair of weight and offset values). Then, the same motion compensation process as for weighted bi-prediction is performed with the derived parameters.

Generalized Bi-Prediction.

Generalized bi-prediction (GBi) has been proposed to improve the motion compensated prediction for bi-prediction mode. Generalized bi-prediction is described in, for example, C.-C. Chen, X. Xiu, Y. He, Y. Ye, "Generalized Bi-prediction for Inter Coding", JVET-C0047, May 2016; and International Application Publication No. WO2017197146, "Systems and Methods for Generalized Multi-Hypothesis Prediction for Video Coding," published 16 Nov. 2017.

In bi-prediction mode, the prediction signal at sample x as given by Eq. 1 can be calculated by $$P[x] = w_0 * P_0[x+v_0] + w_1 * P_1[x+v_1], \quad \text{Eq. 1}$$

where P[x] denotes the resulting prediction signal of a sample x located at a picture position x, $P_i[x+v_i]$ is the motion-compensated prediction signal of x using the motion vector (MV) $v_i$ for i-th list (e.g. list 0, list 1), and $w_0$ and $w_1$ are the two weight values shared across all the samples in a block. Based on this equation, a variety of prediction signals can be obtained by adjusting the weight value, $w_0$ and $w_1$. Some configurations to $w_0$ and $w_1$ may imply the same prediction as conventional uni-prediction and bi-prediction, such as $(w_0, w_1)=(1, 0)$ for uni-prediction with reference list L0, (0, 1) for uni-prediction with reference list L1, and (0.5, 0.5) for the conventional bi-prediction with two reference lists. The weight is signaled per CU. To reduce the signaling overhead, one constraint that may be applied is $w_0+w_1=1$. With this constraint, only one weight needs to be signaled. (As such, the signaling of a single weight may be referred to as signaling of a pair of weights.) Thus Eq. 1 may be further simplified as $$P[x] = (1-w_1) * P_0[x+v_0] + w_1 * P_1[x+v_1]. \quad \text{Eq. 2}$$

To further reduce the weight-signaling overhead, $w_1$ can be discretized to a limited number of available bi-prediction weights, e.g. the seven weights {−¼, ¼, ⅜, ½, ⅝, ¾, 5/4}, so each weight value can be indicated by an index value within a very small limited range. In such a case, the available pairs of bi-prediction weights may be represented as (−¼, 5/4), (¼, ¾), (⅜, ⅝), (½, ½), (⅝, ⅜), (¾, ¼), and (5/4, −¼).

Figure 4:
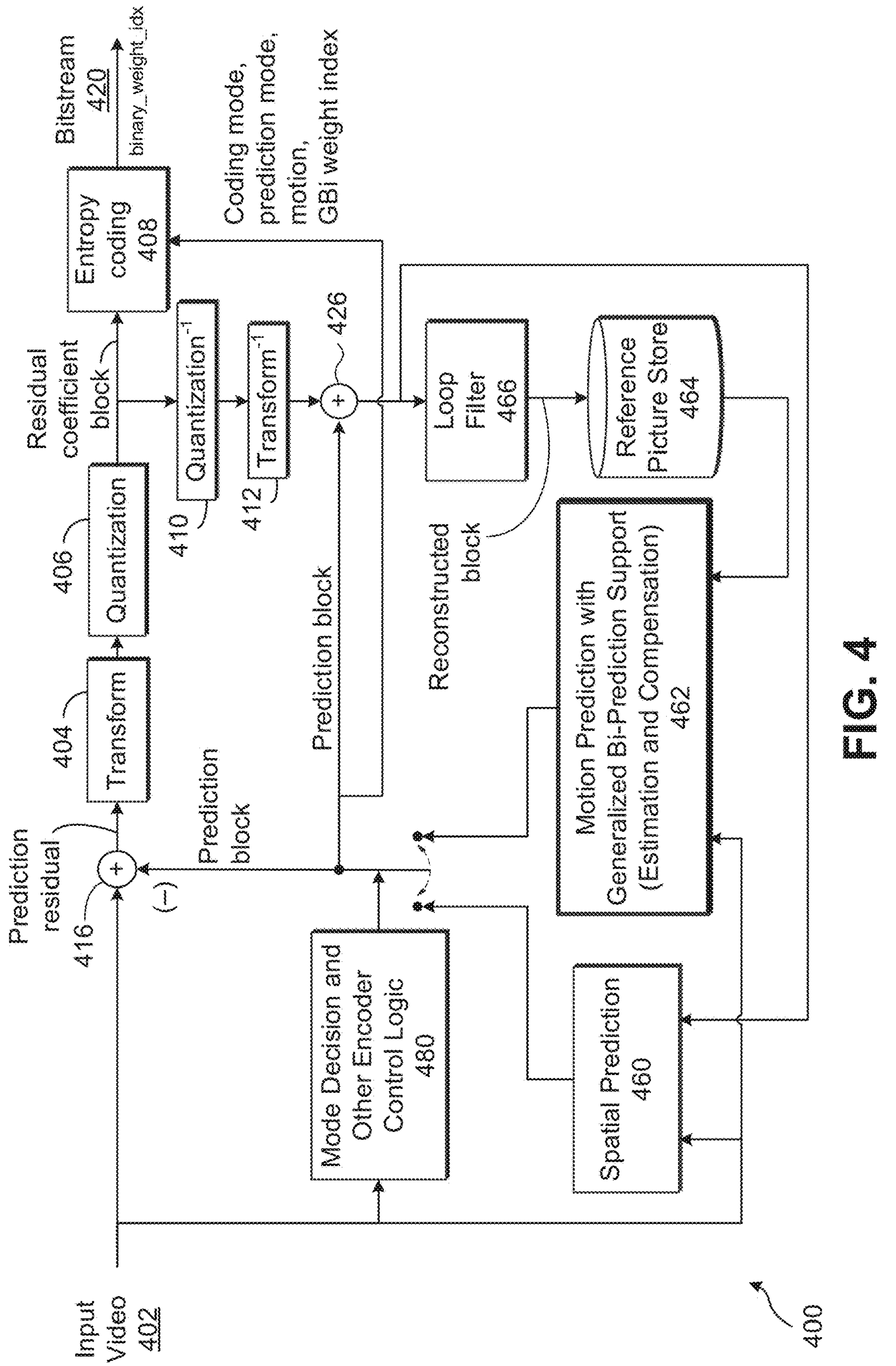
FIG. 4 is a functional block diagram of a video encoder according to some embodiments.
Figure 5:
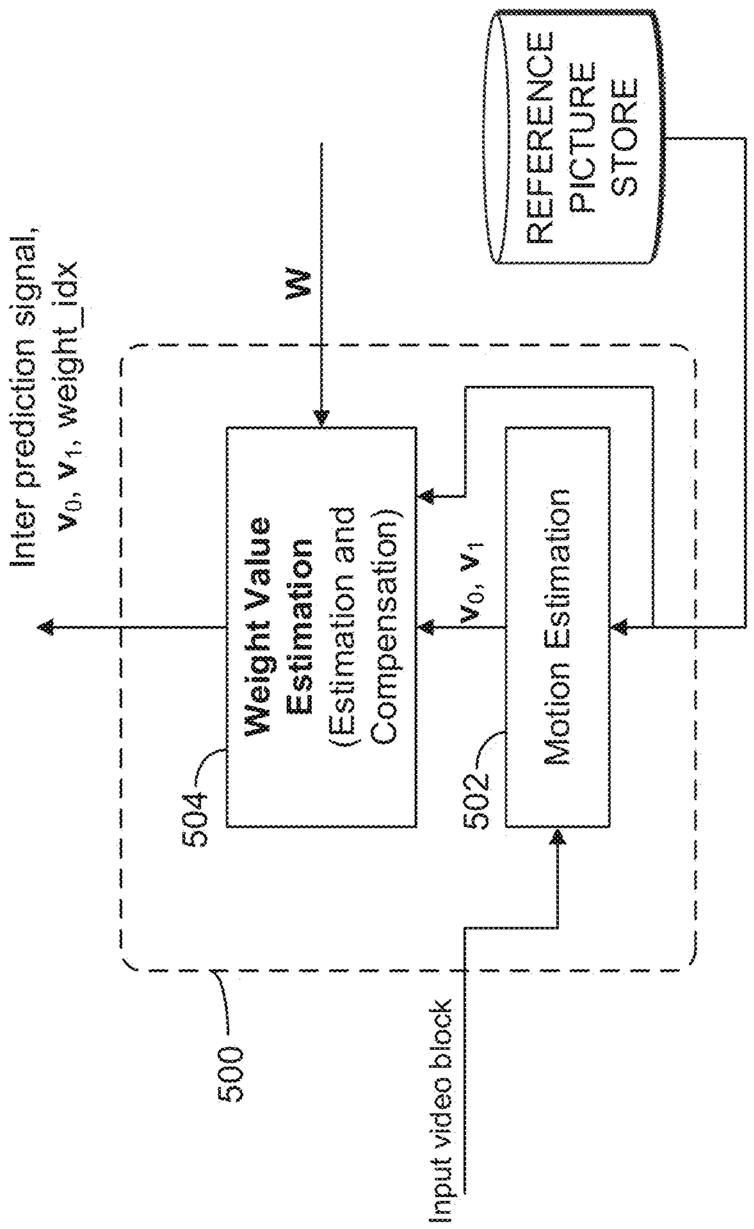
FIG. 5 is a functional block diagram of an exemplary generalized bi-prediction module for use in an exemplary video encoder such as the encoder of FIG. 4.

FIG. 4 is a block diagram of a video encoder according to some embodiments. Similar to the video encoder shown in FIG. 1, spatial prediction and temporal prediction are the two basic pixel-domain prediction modules. The spatial prediction module may be the same as the one introduced in FIG. 1. However, as compared to the motion prediction module 162 of FIG. 1, the motion prediction module 462 of FIG. 4 provides GBi support by allowing bi-prediction to combine two separate prediction signals in a weighted-averaging manner. Further, the selected weight index is signaled in the bitstream. As depicted in FIG. 5, an exemplary GBi estimation module 500 performs a two-step process to generate final inter prediction signal. It includes a motion estimation module 502 for performing motion estimation in reference picture(s) including searching two optimal motion vectors (MVs) pointing to two reference blocks. It further includes a weight value estimation module 504 for searching for an optimal weight index in order to minimize the weighted bi-prediction error between the current video block and bi-prediction prediction. Then the prediction signal of the generalized bi-prediction is computed as a weighted average of the two prediction blocks.

Figure 6:
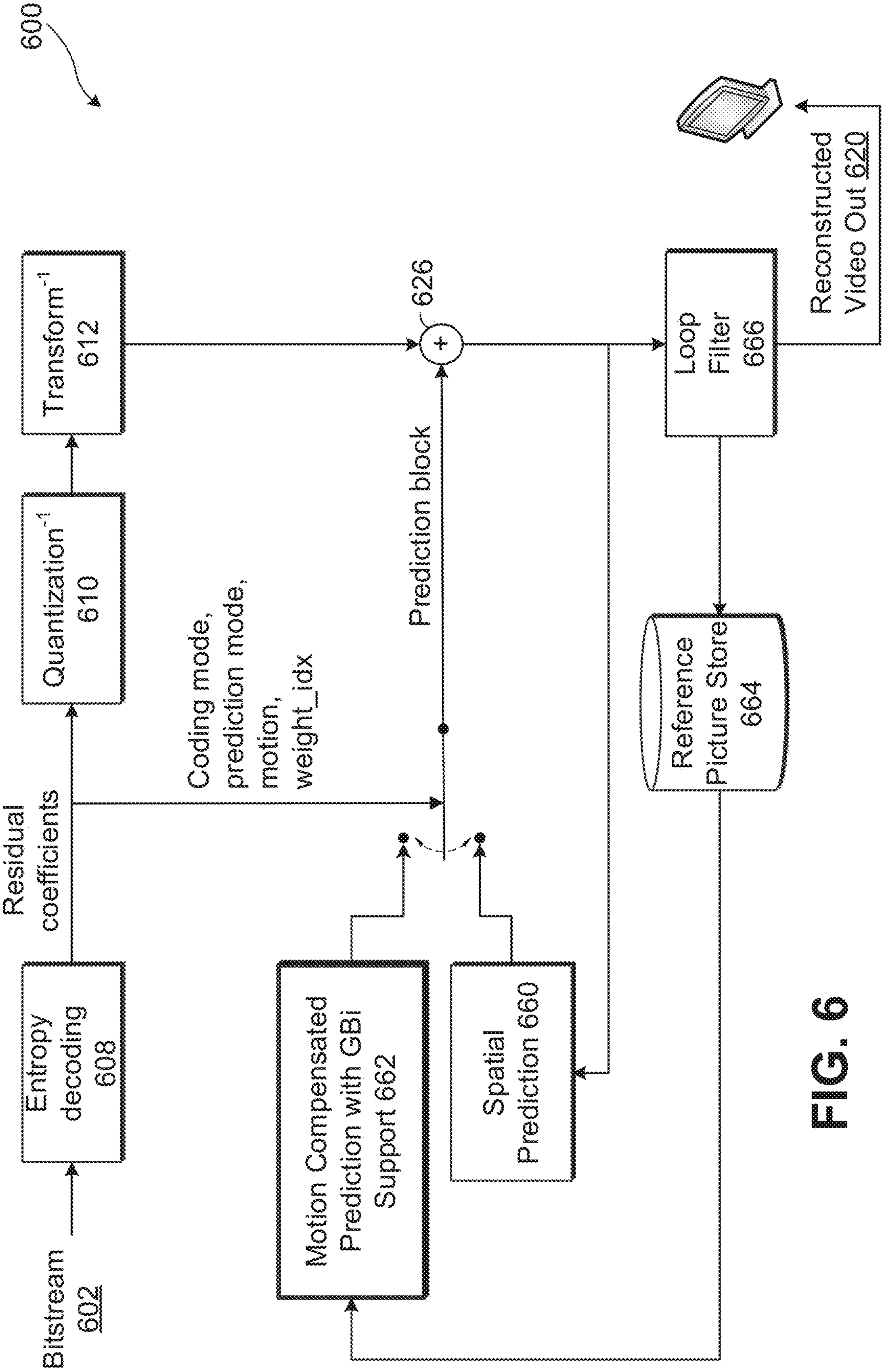
FIG. 6 is a functional block diagram of a video decoder according to some embodiments.

FIG. 6 is a functional block diagram of an exemplary video decoder that decodes the bit-stream produced by, for example, the video encoder of FIG. 4. The coding mode and prediction information are used to derive the prediction signal using either spatial prediction or motion compensated prediction (with generalized bi-prediction support). For the generalized bi-prediction, the block motion information and weight value are received and decoded in order to generate the prediction block.

Figure 7:
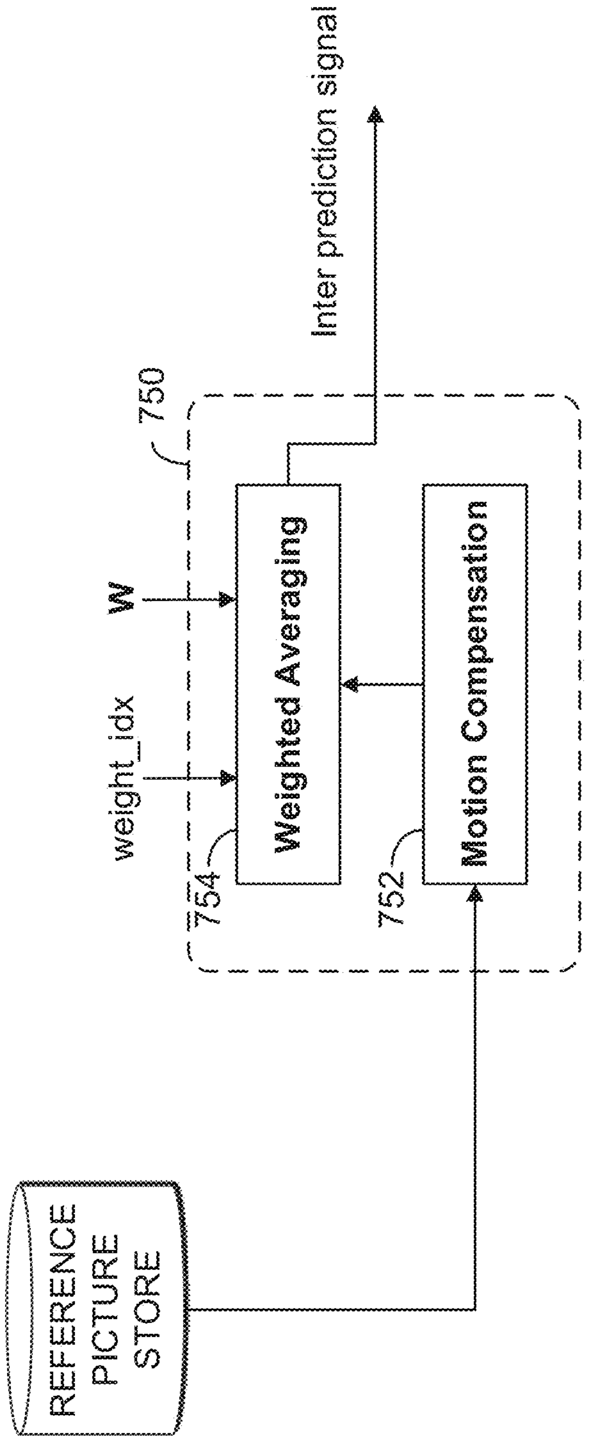
FIG. 7 is a functional block diagram of a generalized bi-prediction module for use in an exemplary video decoder such as the decoder of FIG. 6.

With the block motion information and weight value, the generalized bi-prediction module, e.g. the module 750 illustrated in FIG. 7, computes the prediction signal of generalized bi-prediction as a weighted average of the two motion compensated prediction blocks. The generalized bi-prediction module 750 may include a motion compensation module 752 and a weighted averaging module 754.

Hierarchical Prediction and Temporal Layers.

Figure 8:
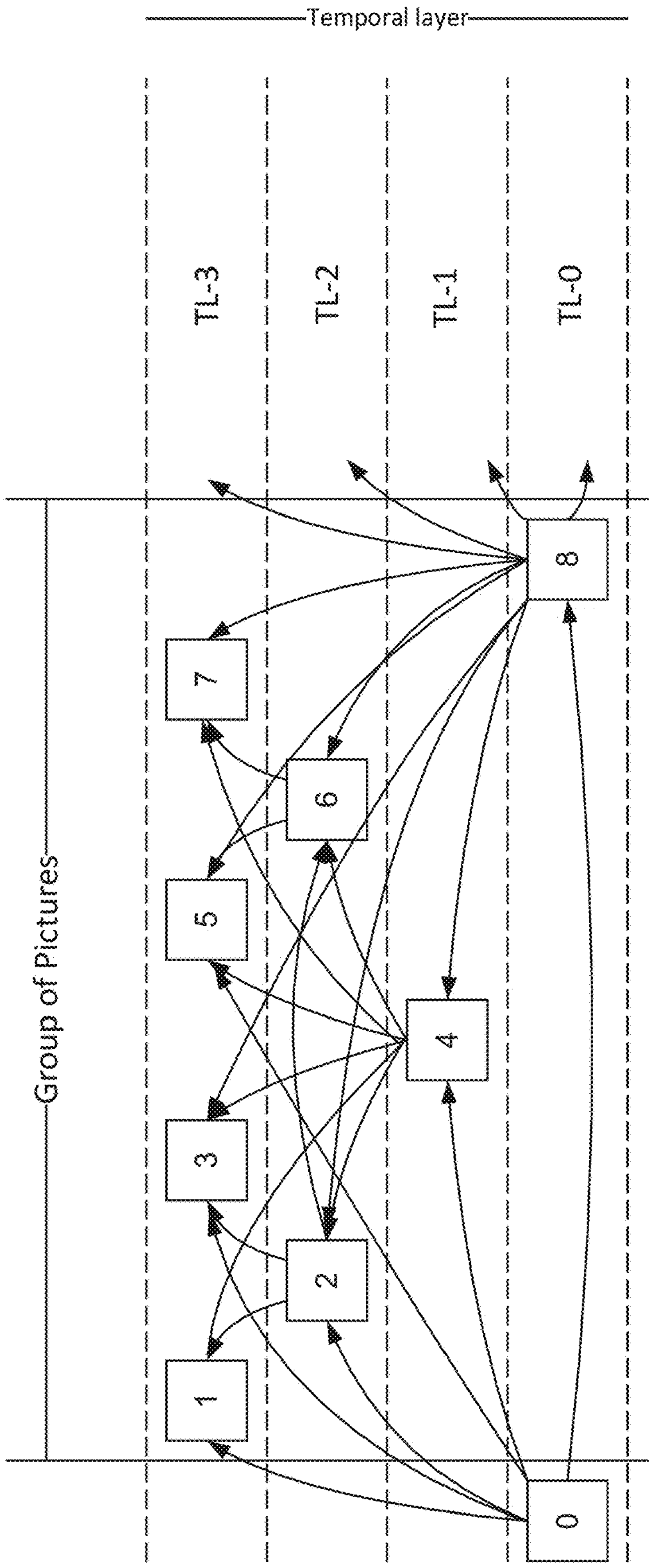
FIG. 8 is a schematic illustration of temporal layers and a hierarchical prediction structure.

A hierarchical prediction structure is widely used in Random Access configuration to provide efficient temporal prediction. FIG. 8 schematically illustrates an example of hierarchical prediction using four temporal layers (TLs), where the arrows depict the prediction relationship between the current picture and its reference pictures (with the arrows starting from the reference pictures and going to the current picture being predicted). As shown, in hierarchical prediction, higher TL pictures are generally predicted from reference pictures that are closer in temporal distance (e.g., the TL-3 pictures are predicted from temporally neighboring pictures), whereas lower TL layer pictures have larger temporal distance from their reference pictures (e.g., the TL0 picture with Picture Order Count (POC) or POC 8 is 8 pictures away from its reference picture with Picture Order Count POC 0). Note also that at the highest TL (TL-3 in FIG. 8), the pictures are not used by any other picture as reference pictures, i.e., they are non-reference pictures. In this example, four TLs are used. A deeper hierarchy may be used, e.g., the JVET common test condition (CTC) uses five TLs in its Random Access configuration.

In hierarchical prediction, picture/slice level Quantization Parameter (QP) values may be adapted depending on the TL the current picture is in. In particular, if QP0 is used for the TL0 pictures, then QP0+delta(TLx) may be used for a picture located at TLx, where delta( ) is a function based on the temporal level, and delta( ) is zero or positive integer. In one example, delta(TLx) may be set to TLx.

OVERVIEW OF EXEMPLARY EMBODIMENTS

At the encoder side, deriving the best motion vectors and the best GBi weights may significantly increase computational complexity. In order to find the best weight/motion vector combination, the encoder may operate to iteratively refine those two MVs and the weights for bi-prediction, that is, $v_0$, $v_1$, and $w_1$ in Eq. 2. The process is performed at the CU level, and if an exhaustive search is used, the computation complexity will become extremely high. For some CUs, it may not be efficient to test all seven weights {−¼, ¼, ⅜, ½, ⅝, ¾, 5/4}. For example, with reference to Eq. 2, when the two predictions $P_0$ and $P_1$ of the current CU to be coded are similar, the final bi-prediction will be similar no matter what weight value is applied. This indicates that it is not necessary for the encoder to test so many weight options and to signal the best one selected from so many weights. Instead, in a case when $P_0$ and $P_1$ are very similar, allowing more weights will incur more signaling overhead for the weights, which could degrade the coding efficiency of GBi's.

Exemplary embodiments disclosed herein are directed at improving the coding efficiency and decreasing the encoding complexity for GBi.

In some embodiments, the number of available GBi weights is reduced based on temporal layers, the temporal distances of two reference pictures, or the relatively quality of the two prediction signals.

In some embodiments the encoding complexity of GBi is reduced by reusing of GBi weights for different motion vector precisions.

Some embodiments include techniques for determining when to terminate a process of determining GBi weights to reduce encoding complexity.

Some embodiments include techniques for rapidly determining GBi weights based on motion estimation cost.

This disclosure describes techniques for reducing the complexity of generalized bi-prediction. Such techniques may be implemented using the encoder of FIG. 4 and the decoder of FIG. 6. Some embodiments operate to reduce the GBi weight signaling overhead. Some embodiments operate to reduce the complexity of GBi weight selection.

Picture/Slice Level GBi Adaptation Based on TL and QP.

As discussed above, QP adaptation is widely used in hierarchical prediction. When QP adaptation is used in conjunction with bi-prediction, if the two reference pictures are from two temporal layers, then they are likely to have different quality. Part of the GBi gain comes from this since a larger weight can be applied to the reference blocks that come from a reference picture with higher quality (e.g. lower QP) to get a better final prediction. With such consideration, the GBi weights may be adapted when encoding pictures at different temporal layers.

In a first embodiment, the number of allowed GBi weights may be adapted depending on the TL of the current picture. Denote the allowed number of GBi weight indices for temporal layer i as $c_i$. For a coding structure with k temporal layers, the number of weights that can be used for each temporal layer can be represented as $\{c_0, c_1, \ldots, c_{k-1}\}$. Usually, lower temporal layer pictures have higher quality and will be used more frequently as a reference picture to code other pictures (from the same or higher temporal levels). For this reason, the coded quality of lower TL pictures is more important in terms of achieving better overall coding efficiency. Therefore, in some embodiments, a greater number of GBi weights may be used for lower TL pictures in order to improve the prediction quality and coded quality of lower TL pictures. For example, the condition $c_0 \leq c_1 \leq \ldots \leq c_{k-1}$ may be applied such that there is a greater number of weight choices for lower TL pictures. At a higher temporal layer, the number of GBi weights allowed is reduced compared to lower temporal layer. This may not only reduce the signaling overhead for higher TL pictures, but also accelerate the encoding for higher TL pictures. For example, the lowest one or two temporal layers (e.g. TL0 and/or TL1) may allow seven different sets of weights, higher intermediate temporal layers (e.g. TL2) may only allow three different sets of weights, and at the highest temporal level (e.g. TL3 in FIG. 8), for the non-reference pictures, only conventional bi-prediction may be allowed (that is, only one set of (0.5, 0.5) weight is allowed).

Compared to blocks in lower temporal layer pictures, the GBi gain for blocks in high temporal layer pictures may be relatively small. This is because high temporal layer pictures generally have reference pictures that are very close in temporal distance, and therefore blocks in these high TLs tend to be more accurately or sufficiently predicted even without GBi. Further, a higher QP is generally used for high temporal layer pictures, which results in more skip blocks and/or zero residual blocks. Thus, besides adapting GBi based on the current picture's TL, the QP value of the current picture may also be considered in GBi adaptation. For example, if the slice/picture level QP of the current picture is high enough, only conventional bi-prediction with equal weights may be allowed (or a smaller set of GBi weights may be allowed). This may bring some quality drop, but the loss can be compensated by reducing the signaling overhead. Since GBi is turned off or a smaller set of GBi weights is used, the GBi index signaling may be skipped or the GBi indices may be coded using fewer bits. Embodiments using GBi adaptation based on slice-level QP may be used in combination with TL-based GBi adaptation discussed above. If the TL and/or slice level QP of the current picture is high enough, the number of allowed GBi weights may be reduced, or GBi may be completely disabled (e.g. only equal weights being allowed for bi-prediction). At the decoder side, the temporal layer and/or slice QP value are known to the decoder. Thus, the decoder may skip the GBi weight information parsing at the CU level if it determines that GBi has been switched off based on the TL and/or slice QP value. By skipping the GBi process for certain temporal layer and/or slice QP values, the GBi can be accelerated with negligible performance loss.

In another embodiment, instead of determining a number of available weights for a picture by using the current picture's TL and/or with the current picture's QP, the encoder may adaptively choose the number of GBi weights that it uses when encoding the current picture. In this case, the encoder may signal in the bitstream the number of allowed GBi weights and the actual allowed GBi weights at the slice/picture level. Such high-level signaling of allowed GBi weights may be signaled as part of the slice header, or may be signaled in the Picture Parameter Set (PPS). At the CU level, only weights that are allowed for the current slice/picture may be used, and only GBi indices associated with these allowed weights may be signaled.

Block Level GBi Adaptation Based on Reference Signal Quality.

As noted above, some embodiments adapt the number of GBi weights at the picture level based on TL and/or slice-level QP. In addition to or instead of adapting GBi weights at the picture level, block level GBi adaptation may also be employed.

In bi-prediction, a current block is predicted from two reference pictures, one from each reference picture list. In GBi, the two reference signals, $P_0$ and $P_1$, are then combined using Equation 2. In some embodiments, GBi weights may be adapted at the block level based on the relative quality of the two prediction signals $P_0$ and $P_1$. Instead of allowing a full set of, e.g., seven weights in GBi for the current block, allowable weights may be constrained in such a way that only larger weights are used for the prediction with higher quality, and only smaller weights are used for the prediction with lower quality. For example, in unconstrained GBi, $w_1$, which is the GBi weight for $P_1$, can have, e.g., seven values, which may be $\{-1/4, 1/4, 3/8, 1/2, 5/8, 3/4, 5/4\}$. For a current block coded with bi-prediction mode, if $P_1$ has higher quality than $P_0$, then only the subset of $w_1$ values that are greater than or equal to (1/2) may be allowed for $w_1$. For example, only the subset $\{1/2, 5/8, 3/4, 5/4\}$ may be allowed for the current block. If, on the other hand, $P_0$ has higher quality than $P_1$, then only the subset of $w_1$ values that are smaller than or equal to (1/2) may be allowed. For example, only subset $\{-1/4, 1/4, 3/8, 1/2\}$ may be allowed for the current block. This way, GBi weight signaling overhead may be reduced, and encoding may also be accelerated.

Different embodiments may use different techniques to estimate the relative quality of $P_0$ and $P_1$. In a first embodiment, the temporal distances between the current slice and each of its list-0 and list-1 reference pictures may be used to estimate the relative quality of $P_0$ and $P_1$. Specifically, the prediction signal that comes from a reference picture that is temporally closer to the current picture is more likely to be of higher correlation and thus provide higher quality prediction. Denote $R_0$ and $R_1$ as the reference pictures from which $P_0$ and $P_1$ are obtained, respectively. And denote $d_0$ and $d_1$ as the temporal distances between $R_0$ and $R_1$ and the current picture, respectively. The temporal distance between two pictures may be measured by the difference of their Picture Order Count. If $d_0 \leq d_1$, then $P_0$ is likely of higher quality than $P_1$, and thus $w_1$ values should be constrained to values smaller than or equal to (1/2), that is, larger weights are assigned to $P_0$ only. In some embodiments, with equal temporal distances $d_0=d_1$, all weight pairs can be considered.

In a second embodiment, the QP values associated with $P_0$ and $P_1$ may be considered in determining the relative quality. This may be the slice level QP values used to code reference pictures $R_0$ and $R_1$, or it may be the block level QP values used to code the prediction blocks $P_0$ and $P_1$, for example, if block-level QP change is applied when coding reference pictures $R_0$ and $R_1$. Because fractional-pel precision motion vectors may be used in motion compensation prediction to obtain $P_0$ and $P_1$, $P_0$ and $P_1$ may correspond to more than one block partition in $R_0$ and $R_1$. Take $P_0$ for example. If it covers N block partitions in $R_0$, and if each of these N block partitions are coded using different block level QPs, then an average of these block level QPs may be used to calculate the block level QP associated with $P_0$. Denote $QP_0$ and $QP_1$ as the QP values associated with $P_0$ and $P_1$, respectively. Without loss of generality, assume $QP_0 \leq QP_1$. Then $P_0$ is likely of higher quality than $P_1$, and thus $w_1$ values should be constrained to values smaller than or equal to ½, that is, larger weights are assigned to $P_0$ only. In some embodiments, with equal QP values, all weight pairs can be considered.

In a third embodiment, the temporal distances of $P_0$ and $P_1$ from the current picture and the QPs associated with $P_0$ and $P_1$ may be used in combination to determine the number of allowed GBi weights for the current block. For example, if $d_0 \le d_1$ and $QP_0 \le QP_1$, then the allowed GBi weights for the current block may be further constrained to favor larger weights for $P_0$. For example, in this case, only the largest two weights can be used for $P_0$. Conversely, out of the full set of, e.g., seven weight values for $w_1$, only the two smallest values {−¼, ¼} are allowed to be used for the current block.

Similar to picture level GBi adaptation, block level GBi adaptation may also be used to accelerate encoding. In the motion estimation stage, the bi-prediction motion search is performed by selecting one reference picture from each reference picture list, searching for the best motion vector for the selected reference picture from one list, fixing the motion vector for this selected reference picture from this list, and refining the motion vector for the selected reference picture from the other list. In this stage, in an exemplary embodiment, the two temporal distances of $P_0$ and $P_1$ and/or QP values associated with $P_0$ and $P_1$ may be computed to determine the subset of allowed GBi weights for the current block. During the encoder search, if a larger weight is being applied to a reference block that comes from a farther away reference picture (and thus is not allowed for the current block), the bi-prediction motion search may be stopped for this reference picture pair, and the process may move on to the next reference picture pair.

GBi Adaptation Based on Similarity Between Two Prediction Signals.

The GBi prediction is computed using Equation 2, where the two prediction signals $P_0$ and $P_1$ are weighted averaged. When $P_0$ and $P_1$ are sufficiently similar, it will not be very helpful to apply a large set of weights, because the final prediction will be very similar to each other no matter how different the weights are. Thus, in some embodiments, the set of GBi weights may be constrained by evaluating the similarity between $P_0$ and $P_1$ and determining a level of similarity between $P_0$ and $P_1$. In some embodiments, the level of similarity is determined by computing the Sum of Absolute Difference (SAD) value between $P_0$ and $P_1$. If the SAD value is smaller than a predetermined threshold value, then non-equal GBi weights can be skipped for the current block, and only conventional bi-prediction may be allowed. Other similarity measurements, such as Sum of Squared Error (SSE), may also be used. In some embodiments, a tiered constraint method may be applied. For example, a set of two thresholds may be used, with $T_0 < T_1$. If SAD $(P_0, P_1) < T_0$, then only conventional bi-prediction (with equal weights) is allowed. If $T_0 \le$ SAD $(P_0, P_1) < T_1$, then only a smaller set of GBi weights, for example, a constrained set of three weights containing {¼, ½, ¾}(in this case, the two most biased weights and the equal weight) is allowed. Finally, if $T_1 \le$ SAD $(P_0, P_1)$, then the full set of, e.g., seven GBi weights is allowed.

In some embodiments, similarity-based GBi adaptation may be used in combination with the picture-level or block-level GBi adaptation described above. For example, in the tiered constraint method described above, if $T_0 \le$ SAD $(P_0, P_1) < T_1$, the constrained set of three weights may be further constrained depending on the quality of $P_0$ and $P_1$. Without loss of generality assume $P_0$ has higher quality than $P_1$ (e.g., it comes from a temporally closer reference picture, and/or the QP associated with $P_0$ is lower), then the subset of three weights may be further constrained to a subset of two weights containing {¼, ½} allowed for $w_1$.

Encoder Speedup: Reuse of the GBi Weights for Different Motion Vector Precision.

Currently in JEM, for explicit (that is, non-merge) inter prediction modes, motion vectors can have different precision: ¼-pel precision, 1-pel precision and 4-pel precision. Allowing more motion vector precisions at the block level offers more tradeoff points between bit rate and quality. Without encoder speedup techniques, taking the seven-weight configuration as an example, with three different motion vector precisions, both the motion search and the rate-distortion process would be performed 21 times for bi-prediction, which would lead to very high encoder complexity.

Often, the final motion vectors that are decided by the explicit inter prediction mode with different motion vector precisions are quite similar to each other. As a result, the best reference blocks decided by one motion vector precision may be almost the same as those from the other motion vector precisions. From this observation, it is reasonable to reuse the best GBi weight from one motion precision for the other motion vector precisions.

In one embodiment, according to the current implementation of JEM software, the ¼-pel precision is always tested first in the motion search of the explicit inter prediction mode. In exemplary embodiments, after looping over all the GBi weights to find the best GBi weight for the ¼-pel precision case, the other GBi weights are skipped for the motion search with the remaining motion vector precisions. For example, the subsequent search may test only the conventional (½, ½) weight pair plus the best GBi weight selected by the ¼-pel precision search. By doing this, the number of GBi weight iterations may be reduced, hence bringing down the encoder complexity. In alternative embodiments, the encoding order with respect to the motion vector precision may be changed, and thus the reuse can be made flexible for the other combination, for example reusing the best GBi weight selected by 1-pel for ¼-pel and 4-pel encoding.

In another embodiment, instead of only reusing the best GBi weight for the other motion vector precision, the best two or N weights are selected as candidates for the other motion vector precision to alleviate the potential loss that may have been brought to the encoder by this simplification method. A threshold may be used in determining if another GBi weight apart from the best GBi weight will still be tested by the other motion vector precision. If the rate-distortion cost is smaller than the threshold which is computed from the best GBi weight cost, this specific GBi weight will also be reused for the other motion vector precision.

Embodiments that reuse the best GBi weight can be combined with the GBi adaptation methods discussed above to further improve the flexibility of the encoder to find a better tradeoff between complexity and performance. By doing this, the complexity of the GBi encoding process can be reduced while still providing a high performance.

Encoder Speedup: Early Termination of GBi Process.

In some embodiments, the GBi weight searching process is simplified by early termination. Two categories of early termination conditions are described below.

One early termination condition used in some embodiments is based on the partition depth of the current block. In the current design of JEM, a quad-tree binary-tree CU hierarchical structure is adopted where the coding tree unit (CTU) is first partitioned using a quad-tree partition. The quad tree leaf node serves as the root for the binary tree (BT). In general, GBi is less effective when the CU size is very small. Thus, in some embodiments, the current BT depth is checked in order to decide whether to early terminate the GBi searching process. The equal weight pair motion search will always be applied regardless of the BT depth. For unequal weight pair, if it is found that the current BT depth is already larger than a threshold value, the remaining GBi weight may be skipped in motion search. Instead of using the BT depth, the BT size may also be used to determine whether nonequal GBi weights will be tested in motion search or not. If the BT size (e.g. BT width multiplied by BT height) is smaller than a predetermined threshold, then nonequal GBi weights may be skipped.

In some embodiments, this method may also be used to disable GBi normatively for the current BT, if the current BT has depth larger than a preset threshold and/or if its size is smaller than a preset threshold. When this method is used normatively, the decoder may operate to skip parsing GBi weights for such blocks.

Another early termination condition used in some embodiments is based on the coded block flag (CBF). A CBF flag is used in the JEM codec to indicate whether the residual errors, which are computed by subtracting the prediction block from the current block, will be encoded and signaled to the decoder or not. Usually, when the encoder decides to skip the residual errors, it indicates that the prediction is already good enough since all the quantized transform coefficients can be set to 0. Taking advantage of this, in some embodiments, the checking of remaining GBi weights in the motion search process is terminated if the encoder has already found one GBi weight (equal or unequal) for which the CBF flag can be set to 0 (indicating that residual errors do not need to coded), because this indicates that an efficient weight pair for the current block has been found.

There may be two cases in which the encoder will decide to set the CBF to 0. A first case is when the encoder tries the mode with CBF set to 0 to try to reduce overhead. A second case is when all the transform coefficients are indeed all 0 after quantization of the transform coefficients. From a performance perspective, early terminating GBi weight testing due to the first case may lead to performance drop. Thus, in some embodiments, early termination based on the CBF flag may be performed only for the second case.

Encoder Speedup: GBi Simplification Based on Merge Mode.

In the current JEM implementation, the explicit inter prediction mode where the GBi weight index searching takes place is located after all the other inter prediction modes. Making use of this design, in some embodiments, the information from the other inter prediction modes is used to accelerate the GBi search process. More specifically, if the best inter prediction mode is a skip merge candidate by the time explicit inter prediction mode is about to be tested, and the GBi weight from the skip merge mode is unequal weight (GBi weights for a skip merge block are inherited from the selected skip merge candidate), unequal weights for the explicit inter prediction modes do not need to be checked, since using the GBi weight merged from a spatial or temporal neighboring block can already provide a very good prediction for which no residual needs to be transmitted.

In another embodiment, to further ensure the performance of GBi, during the explicit inter prediction mode testing, besides the equal weight, we may also want to test the GBi weight which is the same as the merged weight from the skip merge mode.

In a further embodiment, during the explicit inter prediction mode testing, all GBi weights (including the equal weight) may be tested except the GBi weight that is the same as the merged weight.

Encoder Speedup: Motion Estimation Cost Based GBi Simplification.

The current GBi implementation is a rate-distortion based implementation in which, after motion estimation, the rate-distortion (RD) cost of encoding the current block using each of the possible GBi weights is computed. Then, the GBi weight with the smallest RD cost will be selected. The RD process is relatively complex since transform and quantization are involved. Thus, in some embodiments, the complexity of GBi is further reduced by choosing the best GBi weight in the motion estimation stage.

In the motion estimation stage, the bitrate has already been estimated for both uni-prediction and bi-prediction in order to decide whether to use bi-prediction. In addition, the SAD or sum of absolute transformed differences (SATD) is also computed (depending on the motion vector precision, SAD or SATD may be used) as distortion. With the estimated bitrate and distortion, a cost is computed. In an exemplary embodiment, the best GBi weight is selected using the cost from the motion estimation stage (that is, selecting the GBi weight as the one with lowest SAD or SATD). By doing this, only one RD cost calculation needs to be performed so that the complexity of GBi is reduced.

Figure 9:
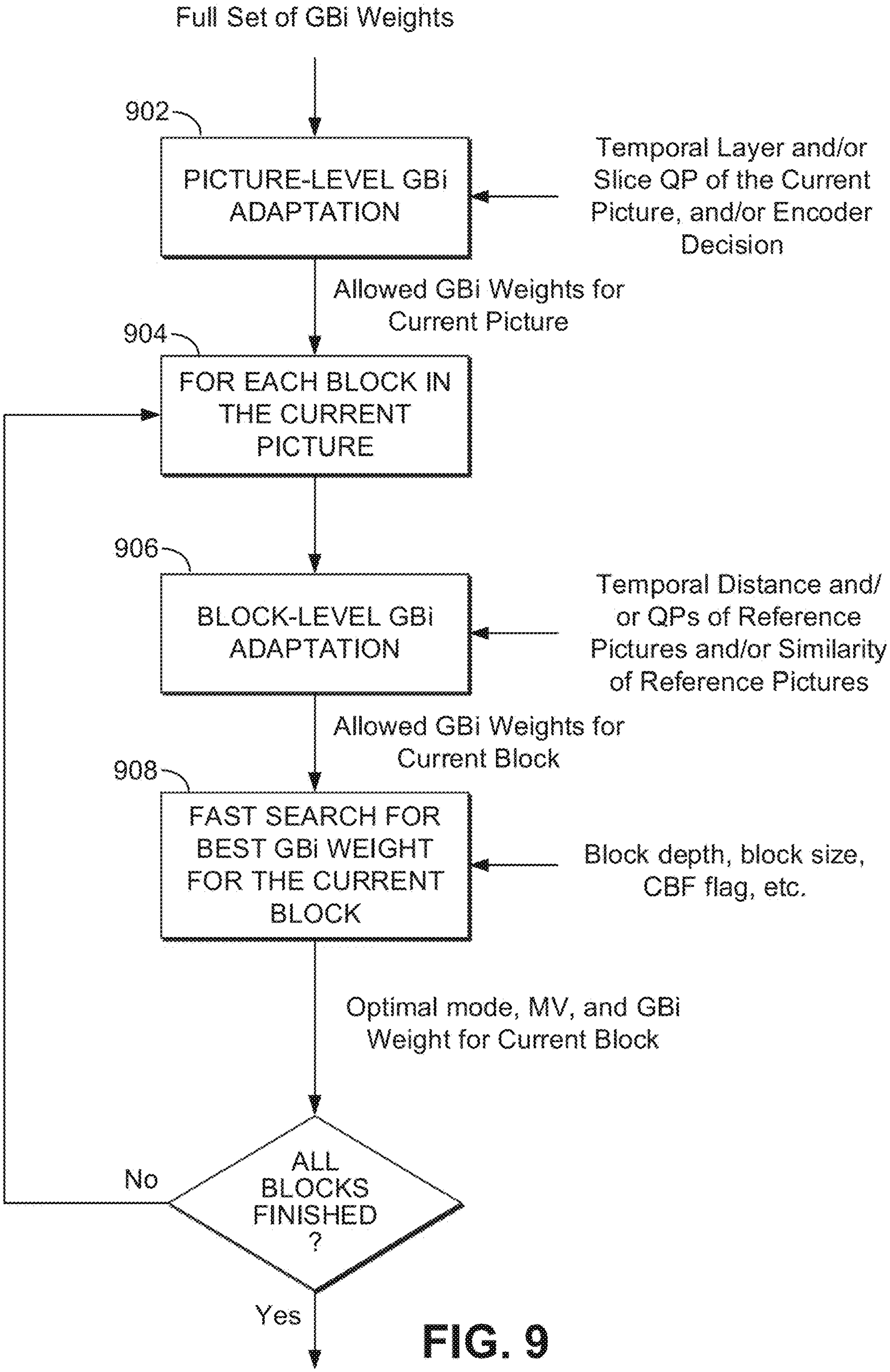
FIG. 9 is a flow chart of generalized bi-prediction (GBi) adaptation and acceleration methods employed in some embodiments.

FIG. 9 is a flow chart that summarizes the proposed GBi adaptation and acceleration methods. In order to provide better tradeoff between GBi's signaling overhead and performance, and to accelerate encoding, various embodiments are disclosed in this disclosure. These embodiments may be used in various combinations. In the example of FIG. 9, several embodiments are combined. Given a full set of GBi weights, picture-level GBi weight adaptation may be applied (902), for example based on the current picture's TL, QP, or the encoder's decision, and a reduced set of GBi weights may be selected for the current picture. Then, when coding each block (904) in the current picture, block-level GBi weight adaptation (906) may be applied, for example based on the two prediction blocks' temporal distance, their relative quality, and/or their similarity to each other, and a further reduced set of GBi weights may be selected for the current block. Then, within the set of allowed GBi weights for the current block, the encoder may use the acceleration methods described herein (e.g., based on the current block's depth, partition size, CBF flag, etc.) to select the best coding mode (908) for the current block, including the best motion vectors, reference indices, and the best corresponding GBi weight.

Note that although FIG. 9 depicts a flow chart in which several disclosed embodiments are used, a subset of the disclosed embodiments may alternatively be used. For example, the picture-level GBi adaptation (902) may be bypassed, and the full set of GBi weights may be directly fed into the block-level GBi adaptation block. Other combinations are possible, for example, encoder acceleration (908) may not be applied, and instead an exhaustive search for the optimal GBi weight may be performed.

Although many embodiments are described herein as starting with a set of seven GBi weights, $\{-1/4, 1/4, 3/8, 1/2, 5/8, 3/4, 5/4\}$, as the full GBi weight set, the proposed methods are generally applicable to any set of starting GBi weights, which could include a different number of weights, and/or a set of different weights.

Scalable Video Coding Overview.

As described above, some embodiments employ multi-layer video coding technologies. For example, multiple layer video coding technologies, such as scalable video coding and/or multi-view video coding, may be designed to handle more than one video layer, where each layer may be decoded to reconstruct a video signal of a particular spatial resolution, temporal resolution, fidelity, and/or view.

Scalable video coding may improve the quality of experience for video applications running on devices with different capabilities over heterogeneous networks. Scalable video coding may encode the signal once at a highest representation (e.g., temporal resolution, spatial resolution, quality, etc.), but enable decoding from subsets of the video streams depending on the specific rate and representation required by certain applications running on a client device. Scalable video coding may save bandwidth and/or storage compared to non-scalable solutions. The international video standards, e.g., MPEG-2 Video, H.263, MPEG4 Visual, H.264, etc., may have tools and/or profiles that support modes of scalability.

Table 1 provides an example of different types of scalabilities along with the corresponding standards that may support them. Bit-depth scalability and/or chroma format scalability may be tied to video formats (e.g., higher than 8-bit video, and chroma sampling formats higher than YUV4:2:0), for example, which may primarily be used by professional video applications. Aspect ratio scalability may be provided.

TABLE 1

| Scalability | Example | Standards |
|---|---|---|
| View scalability | 2D→3D (2 or more views) | MVC, MFC, 3DV |
| Spatial scalability | 720 p→1080 p | SVC, scalable HEVC |
| Quality (SNR) scalability | 35 dB→38 dB | SVC, scalable HEVC |
| Temporal scalability | 30 fps→60 fps | H.264/AVC, SVC, scalable HEVC |
| Standards scalability | H.264/AVC→HEVC | 3DV, scalable HEVC |
| Bit-depth scalability | 8-bit video → 10-bit video | Scalable HEVC |
| Chroma format scalability | YUV4:2:0→YUV4:2:2, YUV4:4:4 | Scalable HEVC |
| Color Gamut Scalability | BT.709 → BT.2020 | Scalable HEVC |
| Aspect ratio scalability | 4:3→16:9 | Scalable HEVC |

Scalable video coding may provide a first level of video quality associated with a first set of video parameters using the base layer bitstream. Scalable video coding may provide one or more levels of higher quality associated with one or more sets of enhanced parameters using one or more enhancement layer bitstreams. The set of video parameters may include one or more of spatial resolution, frame rate, reconstructed video quality (e.g., in the form of SNR, PSNR, VQM, visual quality, etc.), 3D capability (e.g., with two or more views), luma and chroma bit depth, chroma format, and underlying single-layer coding standard. Different use cases may use different types of scalability, for example, as illustrated in Table 1. A scalable coding architecture may offer a common structure that may be configured to support one or more scalabilities (e.g., the scalabilities listed in Table 1). A scalable coding architecture may be flexible to support different scalabilities with minimum configuration efforts. A scalable coding architecture may include at least one preferred operating mode that may not require changes to block level operations, such that the coding logics (e.g., encoding and/or decoding logics) may be maximally reused within the scalable coding system. For example, a scalable coding architecture based on a picture level inter-layer processing and management unit may be provided, wherein the inter-layer prediction may be performed at the picture level.

Figure 10:
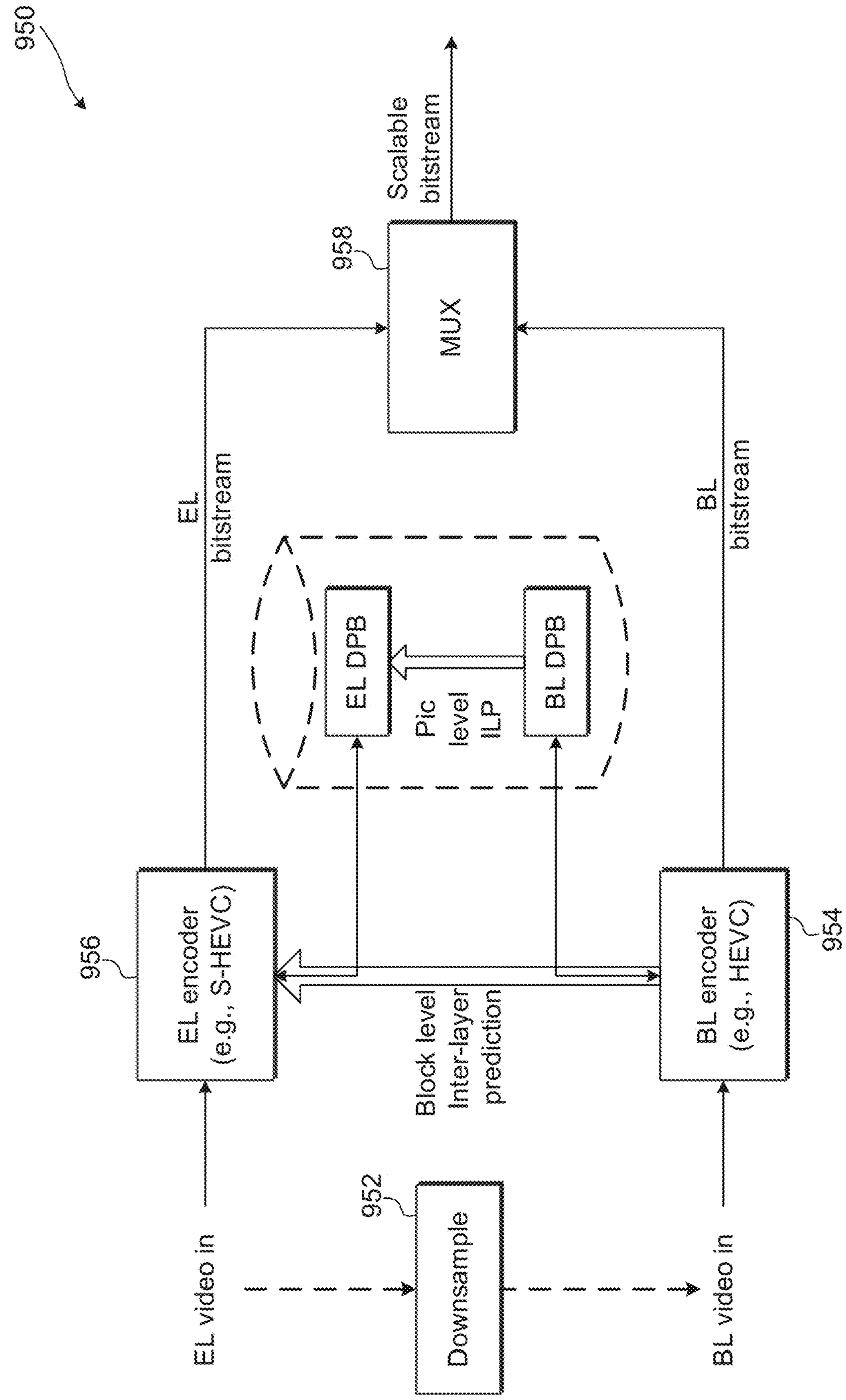
FIG. 10 is a diagram of example architecture of a two-layer scalable video encoder.

FIG. 10 is a diagram of an example architecture of a two-layer scalable video encoder. The video encoder 950 may receive video (e.g., an enhancement layer video input). An enhancement layer video may be down-sampled using a down sampler 952 to create lower level video inputs (e.g., the base layer video input). The enhancement layer video input and the base layer video input may correspond to each other via the down-sampling process and may achieve spatial scalability. The base layer encoder 954 (e.g., an HEVC encoder in this example) may encode the base layer video input block by block and generate a base layer bitstream. FIG. 1 is a diagram of an example block-based single layer video encoder that may be used as the base layer encoder in FIG. 10.

At the enhancement layer, the enhancement layer (EL) encoder 956 may receive the EL input video input, which may be of higher spatial resolution (e.g., and/or higher values of other video parameters) than the base layer video input. The EL encoder 956 may produce an EL bitstream in a substantially similar manner as the base layer video encoder 954, for example, using spatial and/or temporal predictions to achieve compression. Inter-layer prediction (ILP) may be available at the EL encoder 956 to improve its coding performance. Unlike spatial and temporal predictions that may derive the prediction signal based on coded video signals in the current enhancement layer, inter-layer prediction may derive the prediction signal based on coded video signals from the base layer (e.g., and/or other lower layers when there are more than two layers in the scalable system). At least two forms of inter-layer prediction, picture-level ILP and block-level ILP, may be used in the scalable system. Picture-level ILP and block-level ILP are discussed herein. A bitstream multiplexer 958 may combine the base layer and enhancement layer bitstreams together to produce a scalable bitstream.

Figure 11:
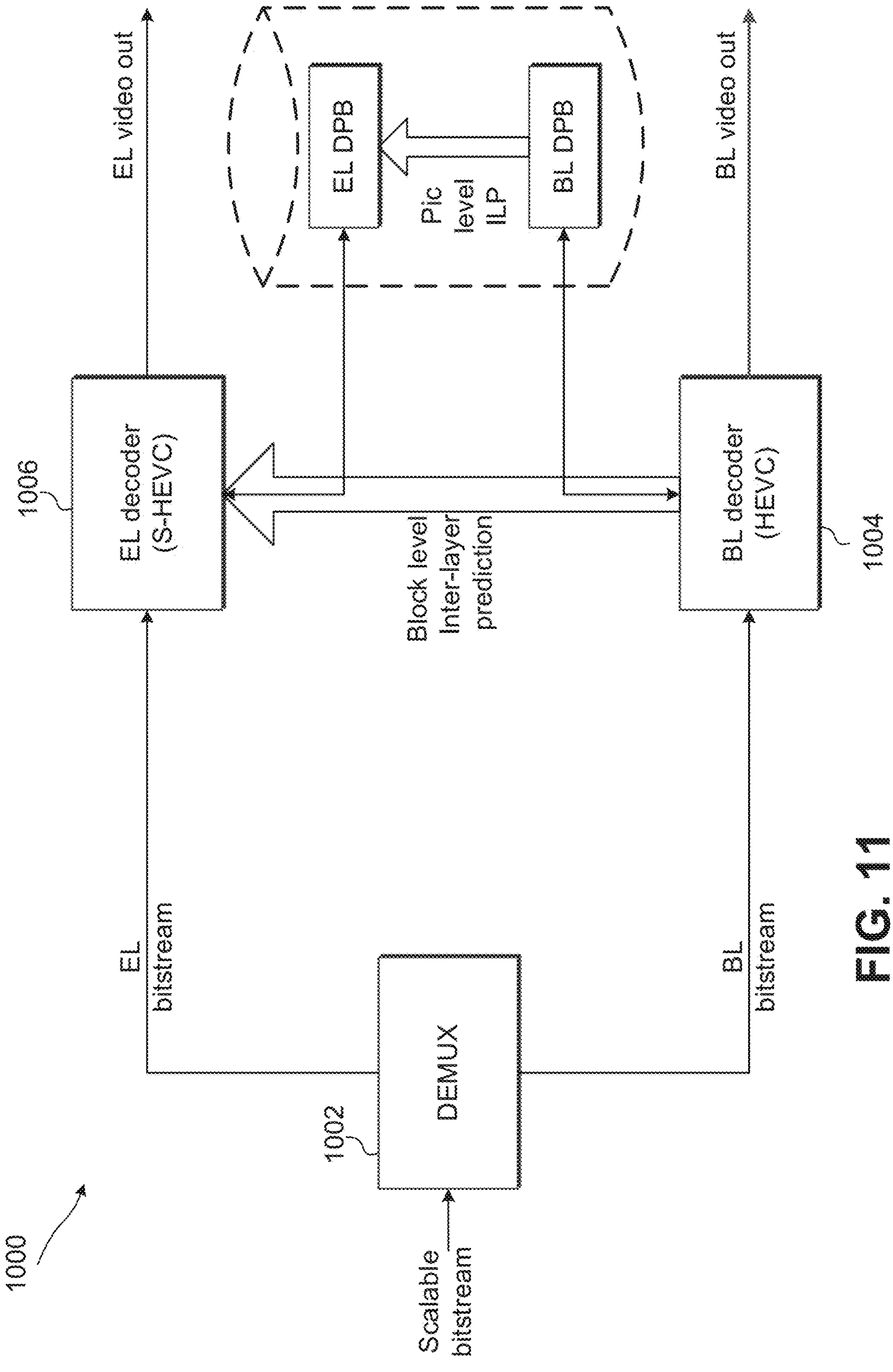
FIG. 11 is a diagram of example architecture of a two-layer scalable video decoder.

FIG. 11 is a diagram of example architecture of a two-layer scalable video decoder. The two-layer scalable video decoder architecture of FIG. 11 may correspond to the scalable encoder in FIG. 10. The video decoder 1000 may receive a scalable bitstream, for example, from a scalable encoder (e.g., the scalable encoder 900). The de-multiplexer 1002 may separate the scalable bitstream into a base layer bitstream and an enhancement layer bitstream. The base layer decoder 1004 may decode the base layer bitstream and may reconstruct the base layer video. FIG. 2 is a diagram of an example block-based single layer video decoder that may be used as the base layer decoder in FIG. 11.

The enhancement layer decoder 1006 may decode the enhancement layer bitstream. The EL decoder 1006 may decode the EL bitstream in a substantially similar manner as the base layer video decoder 1004. The enhancement layer decoder may do so using information from the current layer and/or information from one or more dependent layers (e.g., the base layer). For example, such information from one or more dependent layers may go through inter layer processing, which may be accomplished when picture-level ILP and/or block-level ILP are used. Although not shown, additional ILP information may be multiplexed together with base and enhancement layer bitstreams at the MUX 958. The ILP information may be de-multiplexed by the DEMUX 1002.

Embodiments Using Temporal Layer to Determine Number of Available Bi-Prediction Weights.

In some embodiments, a method is provided of coding a video comprising a plurality of pictures including a current picture, a first reference picture, and a second reference picture, each picture comprising a plurality of blocks. The method includes, for at least a current block in the current picture: determining a number of available bi-prediction weights based at least in part on a temporal layer of the current picture; from among the determined number of available bi-prediction weights, identifying a first weight and a second weight; and predicting the current block as a weighted sum of a first reference block in the first reference picture and a second reference block in the second reference picture, wherein the first reference block is weighted by the first weight and the second reference block is weighted by the second weight.

In some embodiments, a number of bits used to identify the bi-prediction weights in a bitstream is based on the determined number of available bi-prediction weights. In some embodiments, an index identifying at least the first weight is signaled in a bitstream only if the number of available bi-prediction weights is greater than one. In some embodiments, the sum of the first and second weights is one. In some such embodiments, the number of available bi-prediction weights decreases for increasing temporal layers. In some embodiments, seven bi-prediction weights are available for at least one lowest temporal layer. In some embodiments, three bi-prediction weights are available for at least one temporal layer above the lowest temporal layer. In some embodiments, one bi-prediction weight of 0.5 is available for at least one highest temporal layer.

In some embodiments, a method is provided for encoding a video comprising a plurality of pictures including a current picture, a first reference picture, and a second reference picture, each picture comprising a plurality of blocks. The method includes, for at least a current block in the current picture: determining a number of available bi-prediction weights based at least in part on a temporal layer of the current picture; from among the determined number of available bi-prediction weights, selecting a first weight and a second weight for prediction of the current block; and signaling in a bitstream an index identifying at least the first weight only if the determined number of available bi-prediction weights is greater than one. In some such methods, a number of bits used to signal the index is based on the determined number of available bi-prediction weights.

In some embodiments, a method is provided for decoding a video from a bitstream, where the video includes a plurality of pictures including a current picture, a first reference picture, and a second reference picture, each picture having a plurality of blocks. The method includes, for at least a current block in the current picture: determining a number of available bi-prediction weights based at least in part on a temporal layer of the current picture; only if the determined number of available bi-prediction weights is greater than one, parsing from the bitstream an index identifying at least a first bi-prediction weight. In some such embodiments, the number of bits used to signal the index is based on the determined number of available bi-prediction weights.

Embodiments Using Quantization Parameter to Determine Number of Available Weights.

In some embodiments, a method is provided of coding a video comprising a plurality of pictures including a current picture, a first reference picture, and a second reference picture, each picture comprising a plurality of blocks. The method includes, for at least a current block in the current picture: determining a number of available bi-prediction weights based at least in part on a quantization parameter of the current picture; from among the determined number of available bi-prediction weights, identifying a first weight and a second weight; and predicting the current block as a weighted sum of a first reference block in the first reference picture and a second reference block in the second reference picture, wherein the first reference block is weighted by the first weight and the second reference block is weighted by the second weight.

In some such embodiments, a number of bits used to identify the bi-prediction weights in a bitstream is based on the determined number of available bi-prediction weights. In some embodiments, an index identifying at least the first weight is signaled in a bitstream only if the number of available bi-prediction weights is greater than one. In some embodiments, the sum of the first and second weights is one. In some embodiments, the number of available bi-prediction weights decreases for increasing quantization parameter.

In some embodiments, seven bi-prediction weights are available for at least one lowest value of the quantization parameter. In some embodiments, three bi-prediction weights are available for at least one value of the quantization parameter above the lowest value of the quantization parameter. In some embodiments, one bi-prediction weight of 0.5 is available for at least one highest value of the quantization parameter.

In some embodiments, a method is provided for encoding a video comprising a plurality of pictures including a current picture, a first reference picture, and a second reference picture, each picture comprising a plurality of blocks. The method includes, for at least a current block in the current picture: determining a number of available bi-prediction weights based at least in part on a quantization parameter of the current picture; from among the determined number of available bi-prediction weights, selecting a first weight and a second weight for prediction of the current block; and signaling in a bitstream an index identifying at least the first weight only if the determined number of available bi-prediction weights is greater than one. In some such embodiments, a number of bits used to signal the index is based on the determined number of available bi-prediction weights.

A method of decoding a video from a bitstream, the video comprising a plurality of pictures including a current picture, a first reference picture, and a second reference picture, each picture comprising a plurality of blocks. The method includes, for at least a current block in the current picture: determining a number of available bi-prediction weights based at least in part on a quantization parameter of the current picture; and only if the determined number of available bi-prediction weights is greater than one, parsing from the bitstream an index identifying at least a first bi-prediction weight. In some such embodiments, a number of bits used to signal the index is based on the determined number of available bi-prediction weights.

Embodiments Using Quality Metric to Determine Number of Available Weights.

In some embodiments, a method is provide for coding a video comprising a plurality of pictures including a current picture, a first reference picture, and a second reference picture, each picture comprising a plurality of blocks. The method includes, for at least a current block in the current picture: determining a number of available bi-prediction weights based at least in part on a quality metric of the current picture; from among the determined number of available bi-prediction weights, identifying a first weight and a second weight; and predicting the current block as a weighted sum of a first reference block in the first reference picture and a second reference block in the second reference picture, wherein the first reference block is weighted by the first weight and the second reference block is weighted by the second weight.

In some such embodiments, the quality metric is determined by a temporal layer of the current picture. In some embodiments, the quality metric is determined by a quantization parameter of the current picture. In some embodiments, the quality metric is determined by a quantization parameter and a temporal layer of the current picture.

In some embodiments, a method is provided for coding a video comprising a plurality of pictures including a current picture, a first reference picture, and a second reference picture, each picture comprising a plurality of blocks. The method includes, for at least a current block in the current picture: determining a number of available bi-prediction weight pairs based at least in part on a quality metric of the current picture; identifying a weight pair from among the determined number of available bi-prediction weight pairs, the identified weight pair including a higher weight and a lower weight; determining which of the first and second reference pictures is a higher-quality reference picture and which is a lower-quality reference picture; and predicting the current block as a weighted sum of a higher-quality reference block in the higher-quality reference picture and a lower-quality reference block in the lower-quality reference picture, wherein the higher-quality reference block is weighted by the higher weight and the lower-quality reference block is weighted by the lower weight.

Embodiments Signaling the Number of Available Weights.

In some embodiments, a method is provided of coding a video comprising a plurality of pictures including a current picture, a first reference picture, and a second reference picture, each picture comprising a plurality of blocks. The method includes, for at least a current block in the current picture: determining a number of available bi-prediction weights, wherein the number of available bi-prediction weights is signaled in a bitstream; from among the determined number of available bi-prediction weights, identifying a first weight and a second weight; and predicting the current block as a weighted sum of a first reference block in the first reference picture and a second reference block in the second reference picture, wherein the first reference block is weighted by the first weight and the second reference block is weighted by the second weight. In some embodiments, a number of bits used to identify the bi-prediction weights in the bitstream is based on the determined number of available bi-prediction weights. In some embodiments, an index identifying at least the first weight is signaled in a bitstream only if the number of available bi-prediction weights is greater than one.

Embodiments Assigning Weights Based on Reference Picture Quality.

In some embodiments, a method is provided for coding a video comprising a plurality of pictures including a current picture, a first reference picture, and a second reference picture, each picture comprising a plurality of blocks. The method includes, for at least a current block in the current picture: determining which of the first and second reference pictures is a higher-quality reference picture and which is a lower-quality reference picture; from among a plurality of available bi-prediction weights, identifying a first weight and a second weight, wherein the second weight is no greater than the first weight; and predicting the current block as a weighted sum of a higher-quality reference block in the higher-quality reference picture and a lower-quality reference block in the lower-quality reference picture, wherein the higher-quality reference block is weighted by the first weight and the lower-quality reference block is weighted by the second weight.

In some such embodiments, determining which of the first and second reference pictures is a higher-quality reference picture and which is a lower-quality reference picture comprises selecting as the higher-quality reference picture the one of the first and second reference pictures that is temporally closer to the current picture. In some embodiments, each of the first and second reference pictures has an associated quantization parameter, and wherein determining which of the first and second reference pictures is a higher-quality reference picture and which is a lower-quality reference picture comprises selecting as the higher-quality reference picture the one of the first and second reference pictures that has a lower associated quantization parameter. The associated quantization parameters may be slice-level quantization parameters of the first and second reference pictures. The associated quantization parameters may be block-level quantization parameters of the corresponding reference blocks in the first and second reference pictures. A block-level quantization parameter of a respective reference block may be determined by averaging block-level quantization parameters of block partitions used to code the respective reference block.

Some embodiments include determining a number of available bi-prediction weights, where the number of available bi-prediction weights is determined based at least in part on a quality difference between the higher-quality and lower-quality reference picture. A greater quality difference may correspond to a lower number of available bi-prediction weights. The quality difference may be determined based on both respective associated quantization parameters of the respective reference pictures and temporal distance of the respective reference pictures from the current picture.

In some embodiments, a similarity level is determined between the first reference block and the second reference block; and a number of available bi-prediction weights is determined based at least in part on the similarity level, wherein the identifying of the first weight and the second weight is performed from among the determined number of available bi-prediction weights. In some embodiments, a number of available bi-prediction weights is determined based at least in part on a temporal layer of the current picture, wherein the identifying of the first weight and the second weight is performed from among the determined number of available bi-prediction weights. In some embodiments, a number of available bi-prediction weights is determined based at least in part on a quantization parameter of the current picture, wherein the identifying of the first weight and the second weight is performed from among the determined number of available bi-prediction weights.

In some embodiments, the first weight and the second weight are identified using an index signaled in a bitstream. In some such embodiments, the index identifies an unordered pair of weights selected from the group consisting of {5/4, −1/4}, {3/4, 1/4}, {5/8, 3/8}, and {1/2, 1/2}.

Embodiments Using Picture Similarity to Determine Number of Available Weights.

In some embodiments, a method is provided of coding a video comprising a plurality of pictures including a current picture, a first reference picture, and a second reference picture, each picture comprising a plurality of blocks. The method includes, for at least a current block in the current picture: identifying a first reference block in the first reference picture and a second reference block in the second reference picture; determining a similarity level between the first reference block and the second reference block; determining a number of available bi-prediction weights based at least in part on the similarity level; from among the determined number of available bi-prediction weights, identifying a first weight and a second weight; and predicting the current block as a weighted sum of a first reference block in the first reference picture and a second reference block in the second reference picture, wherein the first reference block is weighted by the first weight and the second block is weighted by the second weight. In some such embodiments, determining a similarity level comprises determining a sum of absolute differences between the first reference block and the second reference block.

In some embodiments, in response to a determination that the similarity level is above a threshold, the first and second weights are both 0.5. In some embodiments, for at least one lowest similarity level, the number of available bi-prediction weights is seven. In some embodiments, for at least one similarity level above the lowest similarity level, the number of available bi-prediction weights is three.

Embodiments Using Multi-Stage Motion Search.

In some embodiments, a method is provided of encoding a video in a bitstream. The method includes, for at least one current block in a current picture: using a first precision level, performing a first bi-prediction motion search to select a first set of motion vectors and a first pair of bi-prediction weights, the first search determining a set of the N best pairs of bi-prediction weights; using at least second precision level different from the first precision level, performing at least a second search to select at least a second set of motion vectors and at least a second pair of bi-prediction weights, the second search being performed only over the N best pairs of bi-prediction weights; from among (i) the first set of motion vectors and first pair of bi-prediction weights and (ii) at least the second set of motion vectors and second pair of bi-prediction weights, selecting a selected set of motion vectors and bi-prediction weights for coding of the current block; and encoding the current block using the selected set of motion vectors and bi-prediction weights. In some embodiments, the first precision level is 1/4-pel. In some embodiments, the second precision level is 1-pel.

In some embodiments, the set of N best pairs is a single best pair of bi-prediction weights. In some embodiments, the set of N best pairs includes the pair (1/2, 1/2). In some embodiments, the set of N best pairs includes a best pair of bi-prediction weights and the pair (1/2, 1/2). In some embodiments, the set of N best pairs includes all pairs giving a rate-distortion cost less than a predetermined threshold.

In some embodiments, the first search is performed over a predetermined set of seven bi-prediction weights. In some embodiments, the first search is performed over a predetermined set of available bi-prediction weights, wherein the number of available bi-prediction weights is determined based at least in part on a temporal level of the current picture. In some embodiments, the first search is performed over a predetermined set of available bi-prediction weights, wherein the number of available bi-prediction weights is determined based at least in part on a quantization parameter of the current picture. In some embodiments, encoding the current block includes coding in the bitstream information identifying the selected set of motion vectors and bi-prediction weights.

Embodiments Using Binary Tree Depth to Limit Motion Search.

In some embodiments, a method is provided of encoding a video in a bitstream. The method includes, for at least one current block in a current picture: determining whether a binary tree depth of the current block is no greater than a predetermined threshold; and only if the binary tree depth is no greater than the threshold: performing a search for a best set of motion vectors and bi-prediction weights, the search being performed over a plurality of pairs of bi-prediction weights; and encoding the current block using the best pair of bi-prediction weights. In some such embodiments, in response to a determination that the binary tree depth is greater than the threshold, a search is performed for a best set of motion vectors, the search being performed using only equal bi-prediction weights.

Embodiments Using Block Size to Limit Motion Search.

In some embodiments, a method is provided of encoding a video in a bitstream. The method includes, for at least one current block in a current picture: determining whether a block size of the current block is less than a predetermined threshold; and only if the block size is less than the threshold: performing a search for a best set of motion vectors and bi-prediction weights, the search being performed over a plurality of pairs of bi-prediction weights; and encoding the current block using the best pair of bi-prediction weights. In some embodiments, the method further includes, in response to a determination that the binary tree depth is less than the threshold, performing a search for a best set of motion vectors, the search being performed using only equal bi-prediction weights. In some such embodiments, the block size is the product of a width and a height of the current block.

Embodiments Using CBF to Limit Motion Search.

In some embodiments, a method is provide of encoding a video in a bitstream. The method includes, for at least one current block in a current picture: performing a bi-prediction motion search among a plurality of bi-prediction weights; during the bi-prediction motion search, determining whether a pair of bi-prediction weights has been found such that a coded block flag can be set to zero; in response to a determination that a pair of bi-prediction weights has been found such that a coded block flag can be set to zero, terminating the search; and encoding the current block using the found pair of bi-prediction weights.

In some embodiments, a method is provided of encoding a video in a bitstream. The method includes, for at least one current block in a current picture: performing a bi-prediction motion search among a plurality of bi-prediction weights; during the bi-prediction motion search, determining whether a pair of bi-prediction weights has been found such that a prediction of the current block made using the pair of bi-prediction weights has all zero transform coefficients; in response to a determination that a pair of bi-prediction weights has been found such that a prediction of the current block made using the pair of bi-prediction weights has all zero transform coefficients, terminating the search; and encoding the current block using the found pair of bi-prediction weights.

Embodiments Using Skip Merge Mode to Limit Motion Search.

In some embodiments, a method is provided of encoding a video in a bitstream. The method includes, for at least one current block in a current picture: performing a first inter prediction search among a plurality of merge candidate inter prediction modes to identify a best inter prediction merge mode for prediction of the current block; determining whether the best inter prediction merge mode is a skip merge candidate associated with a pair of unequal generalized bi-prediction weights; performing a second inter prediction search among a plurality of explicit inter prediction modes, wherein the second search is performed over a plurality of pairs of unequal generalized bi-prediction weights only in response to a determination that the best inter prediction merge mode is not a skip merge candidate associated with a pair of unequal generalized bi-prediction weights; and encoding the current block using an inter prediction mode selected from the first or second inter prediction searches.

In some such methods, an inter prediction mode candidate is a skip merge mode candidate only if a prediction of the current block made using the inter prediction mode candidate has all zero transform coefficients. In some methods, in response to a determination that the best inter prediction merge mode is a skip merge candidate associated with a pair of unequal generalized bi-prediction weights, the second search includes a search over explicit inter prediction modes using at least the pair of unequal generalized bi-prediction weights. In some methods, in response to a determination that the best inter prediction merge mode is a skip merge candidate associated with a pair of unequal generalized bi-prediction weights, the second search includes a search over explicit inter prediction modes excluding the pair of unequal generalized bi-prediction weights.

Embodiments Using Distortion Metric in Motion Search.

In some embodiments, a method is provided of encoding a video in a bitstream. The method includes, for at least one current block in a current picture: during a motion estimation stage, computing a distortion metric for each of a plurality of combinations of bi-prediction motion vectors and pairs of bi-prediction weights; selecting a bi-prediction motion vector and associated pair of bi-prediction weights based on the distortion metric; calculating a rate-distortion cost for prediction of the current block using the selected bi-prediction motion vector and associated pair of bi-prediction weights; based at least in part on the rate-distortion cost, determining whether to encode the current block using the selected bi-prediction motion vector and associated pair of bi-prediction weights; and encoding the current block based on the determination. The distortion metric may be, for example, a sum of absolute differences or a sum of absolute transformed differences.

In some such embodiments, the selected bi-prediction motion vector and associated pair of bi-prediction weights is the only bi-prediction motion vector and associated pair of bi-prediction weights for which a rate-distortion cost is calculated for the current block.

In some embodiments, a method is provided of coding a video comprising a plurality of pictures including a current picture, a first reference picture, and a second reference picture, each picture comprising a plurality of blocks. The method includes, for at least a current block in the current picture: determining a number of available bi-prediction weight pairs based at least in part on a quality metric of the current picture; identifying a weight pair from among the determined number of available bi-prediction weight pairs, the identified weight pair including a higher weight and a lower weight; determining which of the first and second reference pictures is a higher-quality reference picture and which is a lower-quality reference picture; and predicting the current block as a weighted sum of a higher-quality reference block in the higher-quality reference picture and a lower-quality reference block in the lower-quality reference picture, wherein the higher-quality reference block is weighted by the higher weight and the lower-quality reference block is weighted by the lower weight.

Coded Bitstream Structure.

Figure 12:
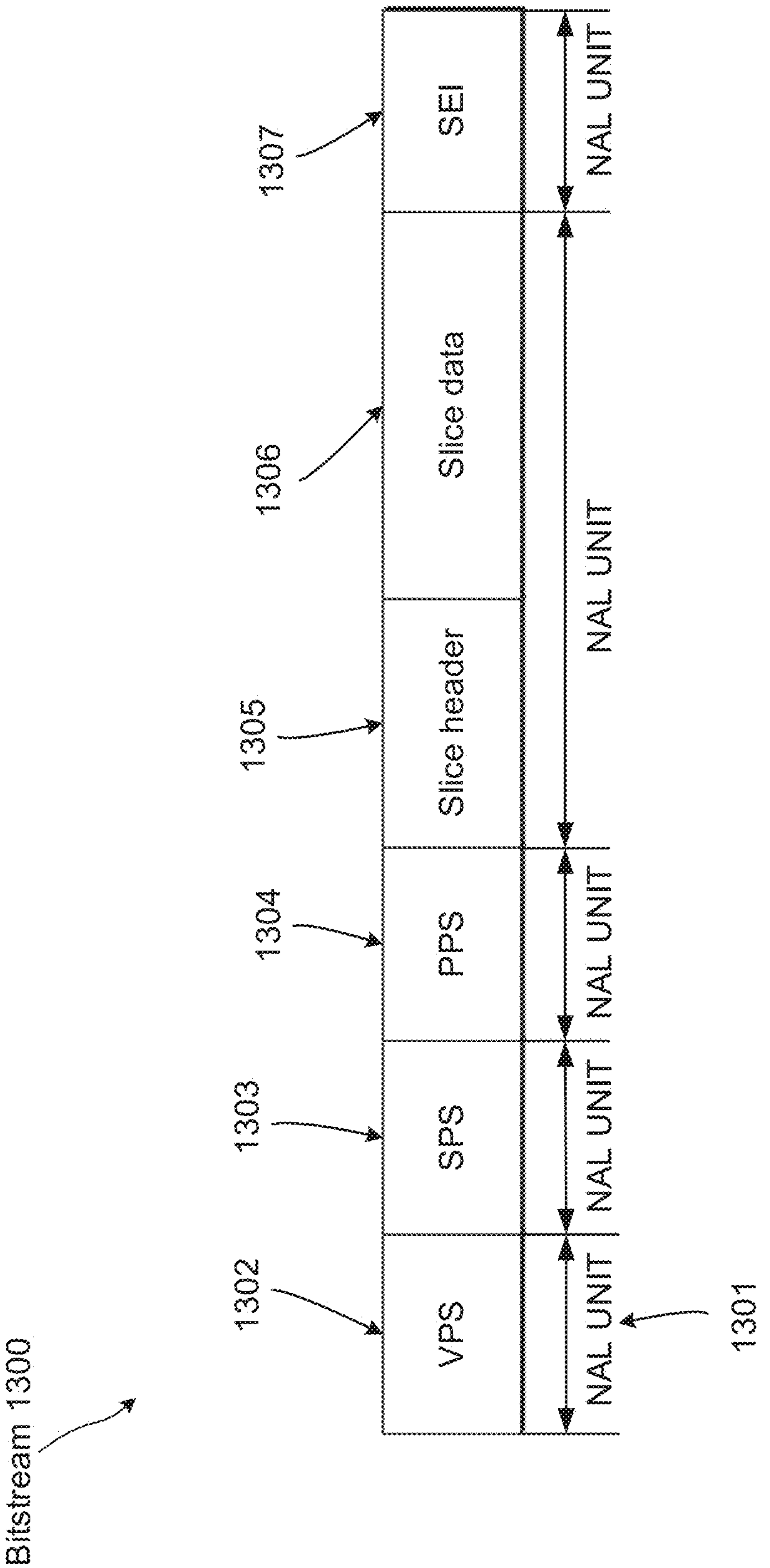
FIG. 12 is a diagram illustrating an example of a coded bitstream structure.

FIG. 12 is a diagram illustrating an example of a coded bitstream structure. A coded bitstream 1300 consists of a number of NAL (Network Abstraction layer) units 1301. A NAL unit may contain coded sample data such as coded slice 1306, or high level syntax metadata such as parameter set data, slice header data 1305 or supplemental enhancement information data 1307 (which may be referred to as an SEI message). Parameter sets are high level syntax structures containing essential syntax elements that may apply to multiple bitstream layers (e.g. video parameter set 1302 (VPS)), or may apply to a coded video sequence within one layer (e.g. sequence parameter set 1303 (SPS)), or may apply to a number of coded pictures within one coded video sequence (e.g. picture parameter set 1304 (PPS)). The parameter sets can be either sent together with the coded pictures of the video bit stream, or sent through other means (including out-of-band transmission using reliable channels, hard coding, etc.). Slice header 1305 is also a high level syntax structure that may contain some picture-related information that is relatively small or relevant only for certain slice or picture types. SEI messages 1307 carry the information that may not be needed by the decoding process but can be used for various other purposes such as picture output timing or display as well as loss detection and concealment.

Communication Devices and Systems.

Figure 13:
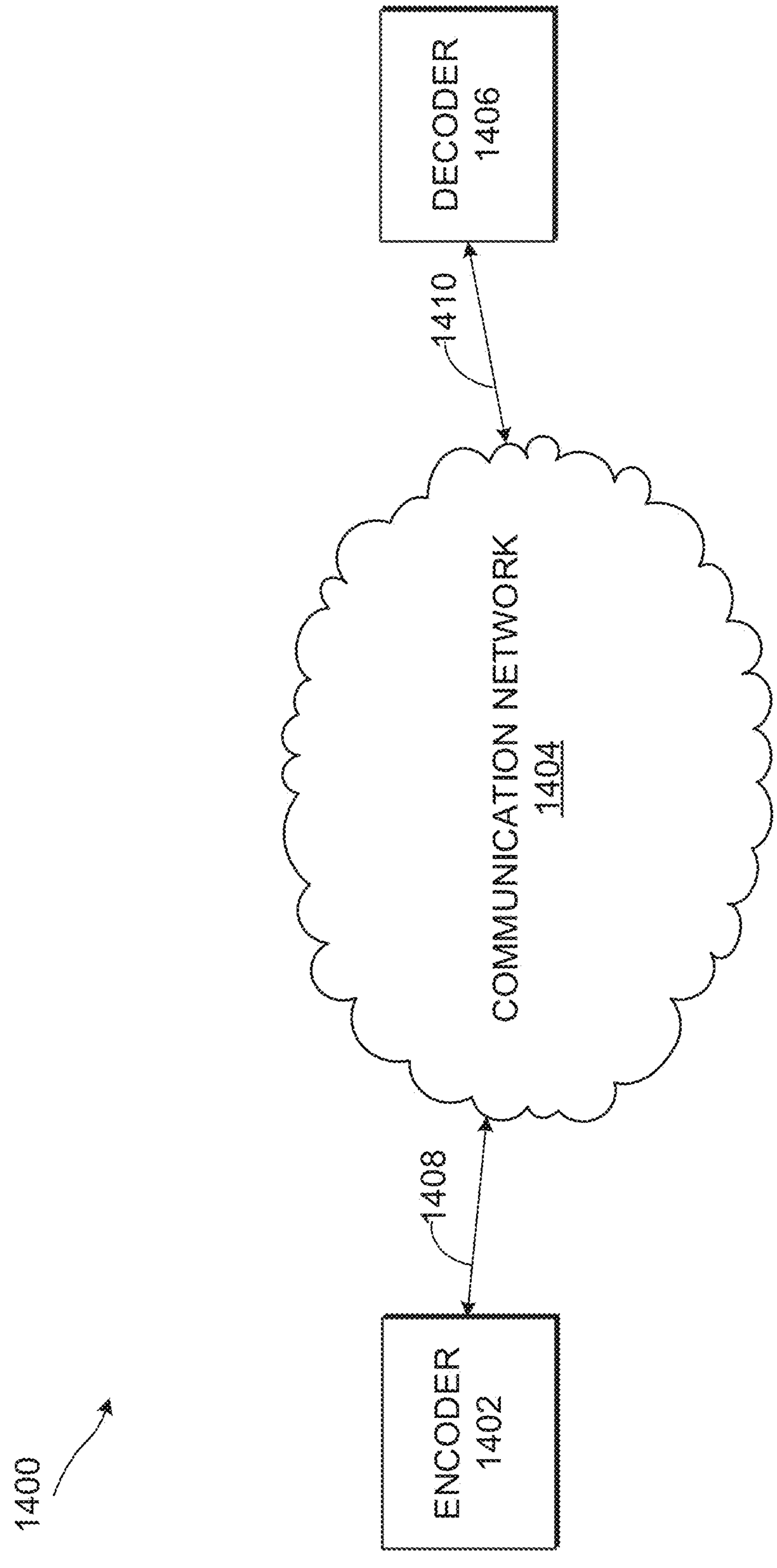
FIG. 13 is a diagram illustrating an example communication system.

FIG. 13 is a diagram illustrating an example of a communication system. The communication system 1400 may comprise an encoder 1402, a communication network 1404, and a decoder 1406. The encoder 1402 may be in communication with the network 1404 via a connection 1408, which may be a wireline connection or a wireless connection. The encoder 1402 may be similar to the block-based video encoder of FIG. 1. The encoder 1402 may include a single layer codec (e.g., FIG. 1) or a multilayer codec (e.g., FIG. 10). For example, the encoder 1402 may be similar to the multi-layer (e.g., two-layer) scalable coding system with picture-level ILP support of FIG. 9. The decoder 1406 may be in communication with the network 1404 via a connection 1410, which may be a wireline connection or a wireless connection. The decoder 1406 may be similar to the block-based video decoder of FIG. 2. The decoder 1406 may include a single layer codec (e.g., FIG. 2) or a multilayer codec (e.g., FIG. 11). For example, the decoder 1406 may be similar to the multi-layer (e.g., two-layer) scalable decoding system with picture-level ILP support of FIG. 11.

The encoder 1402 and/or the decoder 1406 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1404 may be a suitable type of communication network. For example, the communications network 1404 may be a multiple access system that provides content, such as voice, data, video, messaging, broadcast, etc., to multiple wireless users. The communications network 1404 may enable multiple wireless users to access such content through the sharing of system resources, including wireless bandwidth. For example, the communications network 1404 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1404 may include multiple connected communication networks. The communication network 1404 may include the Internet and/or one or more private commercial networks such as cellular networks, WiFi hotspots, Internet Service Provider (ISP) networks, and/or the like.

Figure 14:
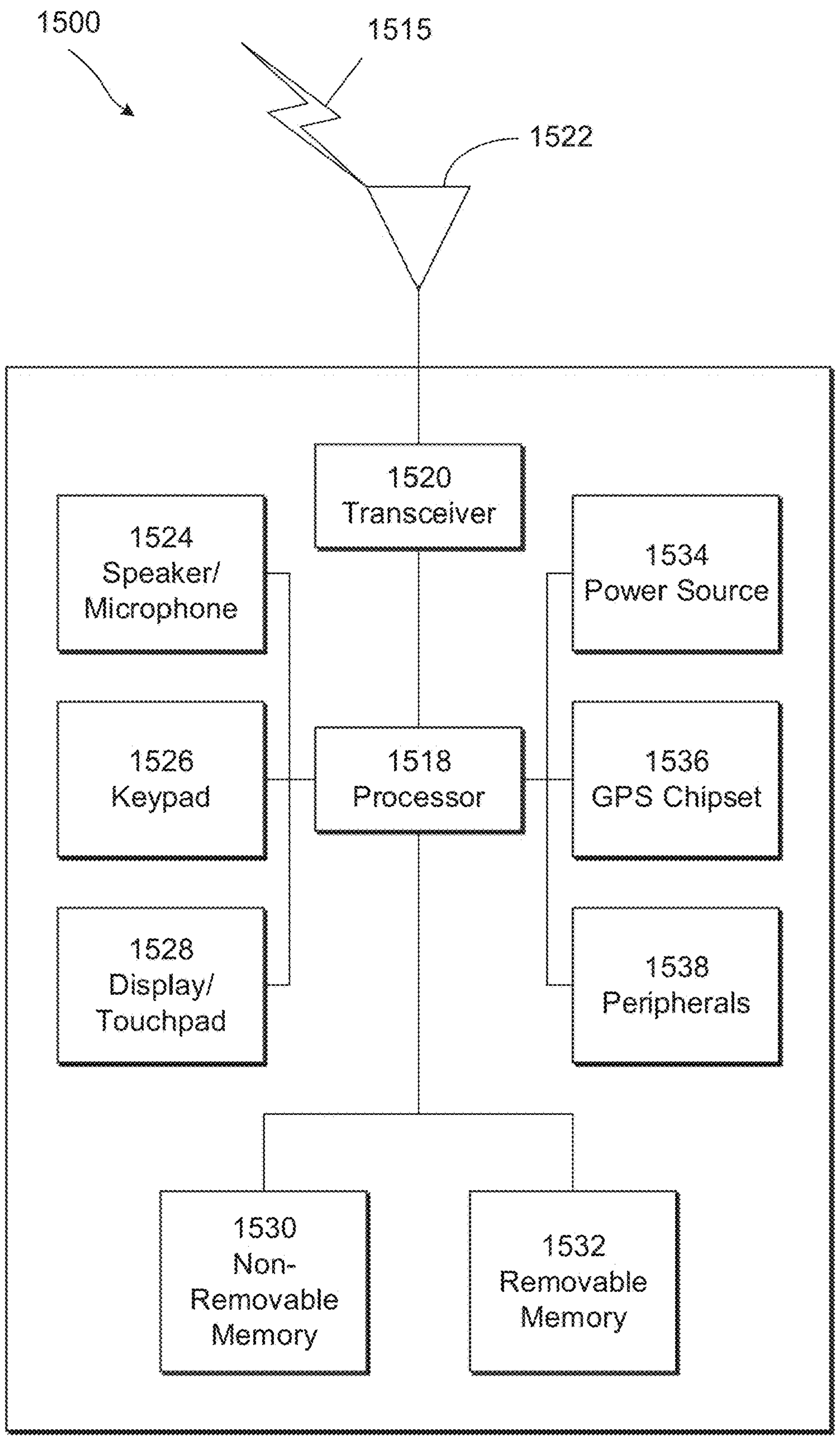
FIG. 14 is a diagram illustrating an example wireless transmit/receive unit (WTRU).

FIG. 14 is a system diagram of an example WTRU. As shown, the example WTRU 1500 may include a processor 1518, a transceiver 1520, a transmit/receive element 1522, a speaker/microphone 1524, a keypad or keyboard 1526, a display/touchpad 1528, non-removable memory 1530, removable memory 1532, a power source 1534, a global positioning system (GPS) chipset 1536, and/or other peripherals 1538. It will be appreciated that the WTRU 1500 may include any sub-combination of the foregoing elements while remaining consistent with an embodiment. Further, a terminal in which an encoder (e.g., encoder 100) and/or a decoder (e.g., decoder 200) is incorporated may include some or all of the elements depicted in and described herein with reference to the WTRU 1500 of FIG. 15.

The processor 1518 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1518 may perform signal coding, data processing, power control, input/output processing, and/or any other functionality that enables the WTRU 1500 to operate in a wired and/or wireless environment. The processor 1518 may be coupled to the transceiver 1520, which may be coupled to the transmit/receive element 1522. While FIG. 14 depicts the processor 1518 and the transceiver 1520 as separate components, it will be appreciated that the processor 1518 and the transceiver 1520 may be integrated together in an electronic package and/or chip.

The transmit/receive element 1522 may be configured to transmit signals to, and/or receive signals from, another terminal over an air interface 1515. For example, in one or more embodiments, the transmit/receive element 1522 may be an antenna configured to transmit and/or receive RF signals. In one or more embodiments, the transmit/receive element 1522 may be an emitter/detector configured to transmit and/or receive IR, UV, or visible light signals, for example. In one or more embodiments, the transmit/receive element 1522 may be configured to transmit and/or receive both RF and light signals. It will be appreciated that the transmit/receive element 1522 may be configured to transmit and/or receive any combination of wireless signals.

In addition, although the transmit/receive element 1522 is depicted in FIG. 14 as a single element, the WTRU 1500 may include any number of transmit/receive elements 1522. More specifically, the WTRU 1500 may employ MIMO technology. Thus, in one embodiment, the WTRU 1500 may include two or more transmit/receive elements 1522 (e.g., multiple antennas) for transmitting and receiving wireless signals over the air interface 1515.

The transceiver 1520 may be configured to modulate the signals that are to be transmitted by the transmit/receive element 1522 and/or to demodulate the signals that are received by the transmit/receive element 1522. As noted above, the WTRU 1500 may have multi-mode capabilities. Thus, the transceiver 1520 may include multiple transceivers for enabling the WTRU 1500 to communicate via multiple RATs, such as UTRA and IEEE 802.11, for example.

The processor 1518 of the WTRU 1500 may be coupled to, and may receive user input data from, the speaker/microphone 1524, the keypad 1526, and/or the display/touchpad 1528 (e.g., a liquid crystal display (LCD) display unit or organic light-emitting diode (OLED) display unit). The processor 1518 may also output user data to the speaker/microphone 1524, the keypad 1526, and/or the display/touchpad 1528. In addition, the processor 1518 may access information from, and store data in, any type of suitable memory, such as the non-removable memory 1530 and/or the removable memory 1532. The non-removable memory 1530 may include random-access memory (RAM), read-only memory (ROM), a hard disk, or any other type of memory storage device. The removable memory 1532 may include a subscriber identity module (SIM) card, a memory stick, a secure digital (SD) memory card, and the like. In one or more embodiments, the processor 1518 may access information from, and store data in, memory that is not physically located on the WTRU 1500, such as on a server or a home computer (not shown).

The processor 1518 may receive power from the power source 1534, and may be configured to distribute and/or control the power to the other components in the WTRU 1500. The power source 1534 may be any suitable device for powering the WTRU 1500. For example, the power source 1534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1518 may be coupled to the GPS chipset 1536, which may be configured to provide location information (e.g., longitude and latitude) regarding the current location of the WTRU 1500. In addition to, or in lieu of, the information from the GPS chipset 1536, the WTRU 1500 may receive location information over the air interface 1515 from a terminal (e.g., a base station) and/or determine its location based on the timing of the signals being received from two or more nearby base stations. It will be appreciated that the WTRU 1500 may acquire location information by way of any suitable location-determination method while remaining consistent with an embodiment.

The processor 1518 may further be coupled to other peripherals 1538, which may include one or more software and/or hardware modules that provide additional features, functionality and/or wired or wireless connectivity. For example, the peripherals 1538 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth© module, a frequency modulated (FM) radio unit, and software modules such as a digital music player, a media player, a video game player module, an Internet browser, and the like.

By way of example, the WTRU 1500 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 1500 and/or a communication network (e.g., communication network 804) may implement a radio technology such as Universal Mobile Telecommunications System (UMTS) Terrestrial Radio Access (UTRA), which may establish the air interface 1515 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 1500 and/or a communication network (e.g., communication network 804) may implement a radio technology such as Evolved UMTS Terrestrial Radio Access (E-UTRA), which may establish the air interface 1515 using Long Term Evolution (LTE) and/or LTE-Advanced (LTE-A).

The WTRU 1500 and/or a communication network (e.g., communication network 804) may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 1500 and/or a communication network (e.g., communication network 804) may implement a radio technology such as IEEE 802.11, IEEE 802.15, or the like.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video decoding method comprising:

for a current block, determining a first temporal distance $d_0$ to a first reference picture and a second temporal distance $d_1$ to a second reference picture;

determining a set of available weights;

determining, in response to $d_0 \leq d_1$, a first weight value in a weight pair from a subset of the set of available weights;

determining a second weight value in the weight pair; and predicting the current block as a weighted sum of a first reference block in the first reference picture and a second reference block in the second reference picture, wherein the first reference block is weighted by the first weight value and the second reference block is weighted by the second weight value.

2. The method of claim 1, wherein determining the first weight value and the second weight value comprises:

performing a search process by checking the set of available weights, wherein the search process is early terminated upon determining the weight pair.

3. The method of claim 1, wherein a sum of the first weight value and the second weight value is constrained to be a fixed value.

4. A video decoding apparatus comprising one or more processors configured to perform at least:

for a current block, determining a first temporal distance $d_0$ to a first reference picture and a second temporal distance $d_1$ to a second reference picture;

determining a set of available weights;

determining, in response to $d_0 \leq d_1$, a first weight value in a weight pair from a subset of the set of available weights;

determining a second weight value in the weight pair; and predicting the current block as a weighted sum of a first reference block in the first reference picture and a second reference block in the second reference picture, wherein the first reference block is weighted by the first weight value and the second reference block is weighted by the second weight value.

5. The apparatus of claim 4, wherein determining the first weight value and the second weight value comprises:

performing a search process by checking the set of available weights, wherein the search process is early terminated upon determining the weight pair.

6. The apparatus of claim 4, wherein a sum of the first weight value and the second weight value is constrained to be a fixed value.

7. A video encoding method comprising:

for a current block, determining a first temporal distance $d_0$ to a first reference picture and a second temporal distance $d_1$ to a second reference picture;

determining a set of available weights;

determining, in response to $d_0 \leq d_1$, a first weight value in a weight pair from a subset of the set of available weights;

determining a second weight value in the weight pair; and predicting the current block as a weighted sum of a first reference block in the first reference picture and a second reference block in the second reference picture, wherein the first reference block is weighted by the first weight value and the second reference block is weighted by the second weight value.

8. The method of claim 7, wherein determining the first weight value and the second weight value comprises:

performing a search process by checking the set of available weights, wherein the search process is early terminated upon determining the weight pair.

9. The method of claim 7, wherein a sum of the first weight value and the second weight value is constrained to be a fixed value.

10. A video encoding apparatus comprising one or more processors configured to perform at least:

for a current block, determining a first temporal distance $d_0$ to a first reference picture and a second temporal distance $d_1$ to a second reference picture;

determining a set of available weights;

determining, in response to $d_0 \leq d_1$, a first weight value in a weight pair from a subset of the set of available weights;

determining a second weight value in the weight pair; and predicting the current block as a weighted sum of a first reference block in the first reference picture and a second reference block in the second reference picture, wherein the first reference block is weighted by the first weight value and the second reference block is weighted by the second weight value.

11. The apparatus of claim 10, wherein determining the first weight value and the second weight value comprises:

performing a search process by checking the set of available weights, wherein the search process is early terminated upon determining the weight pair.

12. The apparatus of claim 10, wherein a sum of the first weight value and the second weight value is constrained to be a fixed value.

* * * * *